United States Patent [19]

Trudeau

[11] Patent Number: 5,209,804
[45] Date of Patent: May 11, 1993

[54] INTEGRATED, AUTOMTED COMPOSITE MATERIAL MANUFACTURING SYSTEM FOR PRE-CURE PROCESSING OF PREIMPREGNATED COMPOSITE MATERIALS

[75] Inventor: Allen E. Trudeau, Ansonia, Conn.

[73] Assignee: United Technologies Corporation, Hartford, Conn.

[21] Appl. No.: 693,748

[22] Filed: Apr. 30, 1991

[51] Int. Cl.$^5$ ............................................. B32B 31/00
[52] U.S. Cl. ................................. 156/364; 156/556; 271/108
[58] Field of Search ................. 156/364, 351, 556; 271/107, 108; 294/64.1

[56] References Cited

U.S. PATENT DOCUMENTS

| | | | |
|---|---|---|---|
| 4,327,906 | 5/1982 | Fröhlich et al. | 271/108 |
| 4,743,319 | 5/1988 | Ramcke | 156/64 |
| 4,994,240 | 2/1991 | Hayashi | 294/64.1 |

FOREIGN PATENT DOCUMENTS

| | | |
|---|---|---|
| 3234216 | 3/1984 | Fed. Rep. of Germany . |
| 3325207 | 1/1985 | Fed. Rep. of Germany . |
| 3628381 | 2/1988 | Fed. Rep. of Germany . |

OTHER PUBLICATIONS

Automated Manufacturing Research Facility; "Automated Ply Laminating Systems (APLS)"; Nov. 1988; p. 969.

T. F. Hall; "CAD/A1 Applications For Automated Manufacturing of Composite Structures"; May 1986.

Primary Examiner—David A. Simmons
Assistant Examiner—William J. Matney, Jr.
Attorney, Agent, or Firm—Terrance J. Radke

[57] ABSTRACT

An integrated, automated composite material manufacturing system for pre-cure processing of preimpregnated composite materials, and particularly, for one-sided preimpregnated composite materials. The system includes a computer control subsystem for controlling and synchronizing the pre-cure processing operations, a material cutting station for controlled cutting of preimpregnated composite materials into individual composite plies of predetermined size and shape based upon composite ply configurations stored in the computer control subsystem means, a ply unloading subsystem for providing automatic pickup, transfer and placement operations to unload the individual composite plies utilizing a multiplicity of bi-functional transfer feet that are automatically, selectively activated to form a predetermined combination operative to engage and retain and disengage and release the tacky surface of individual composite plies, a ply transfer subsystem automatically operative to transfer composite plies between the unloading subsystem and the ply inverting subsystem, a ply inverting subsystem for rotating individual composite plies to place the non-tacky surface up, a ply transfer/layup subsystem to transfer composite plies to a composite article mold having a mold surface and to layup the transferred composite plies on the mold surface, and a ply conforming subsystem for conforming said layed up composite plies with the mold surface.

14 Claims, 6 Drawing Sheets

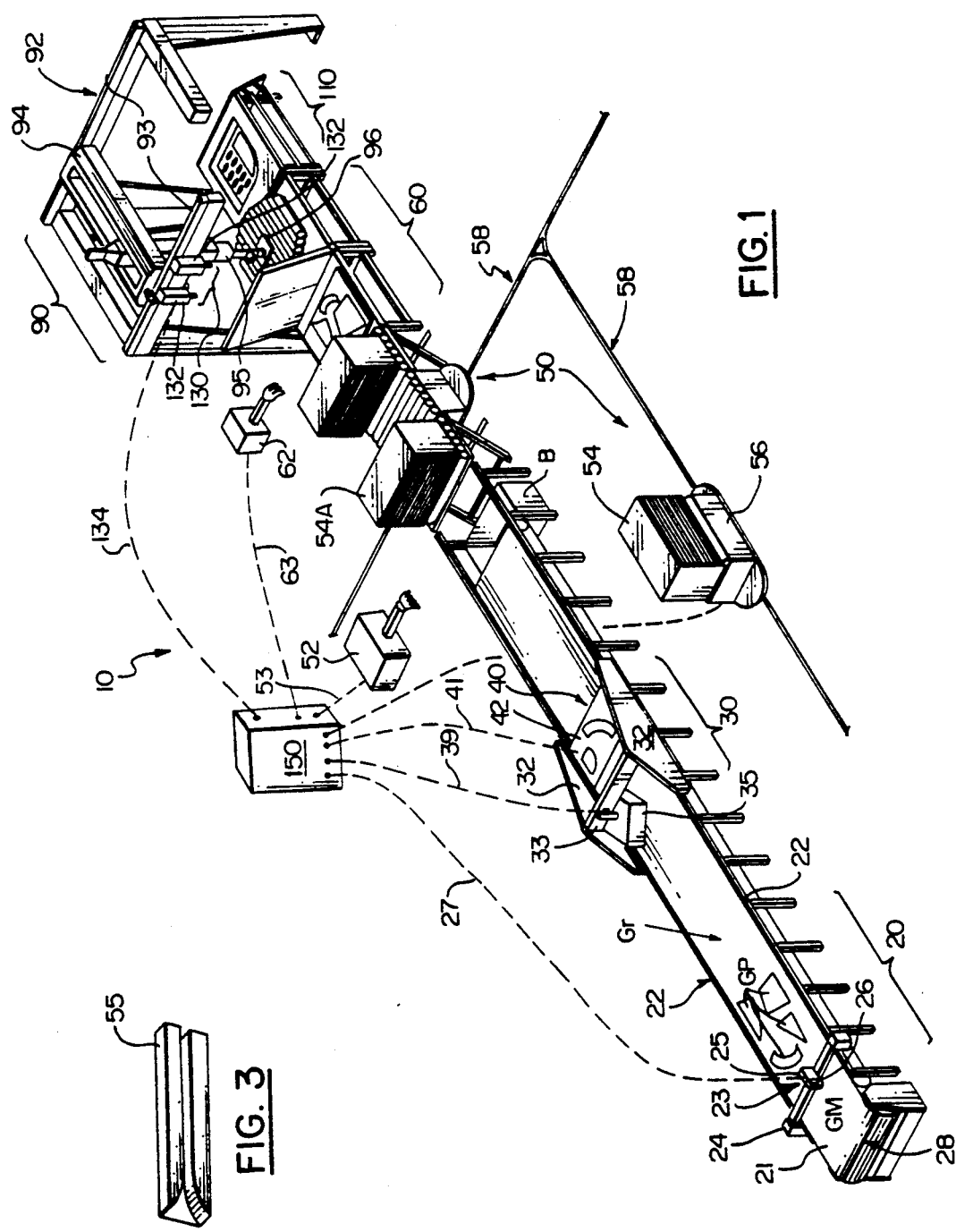

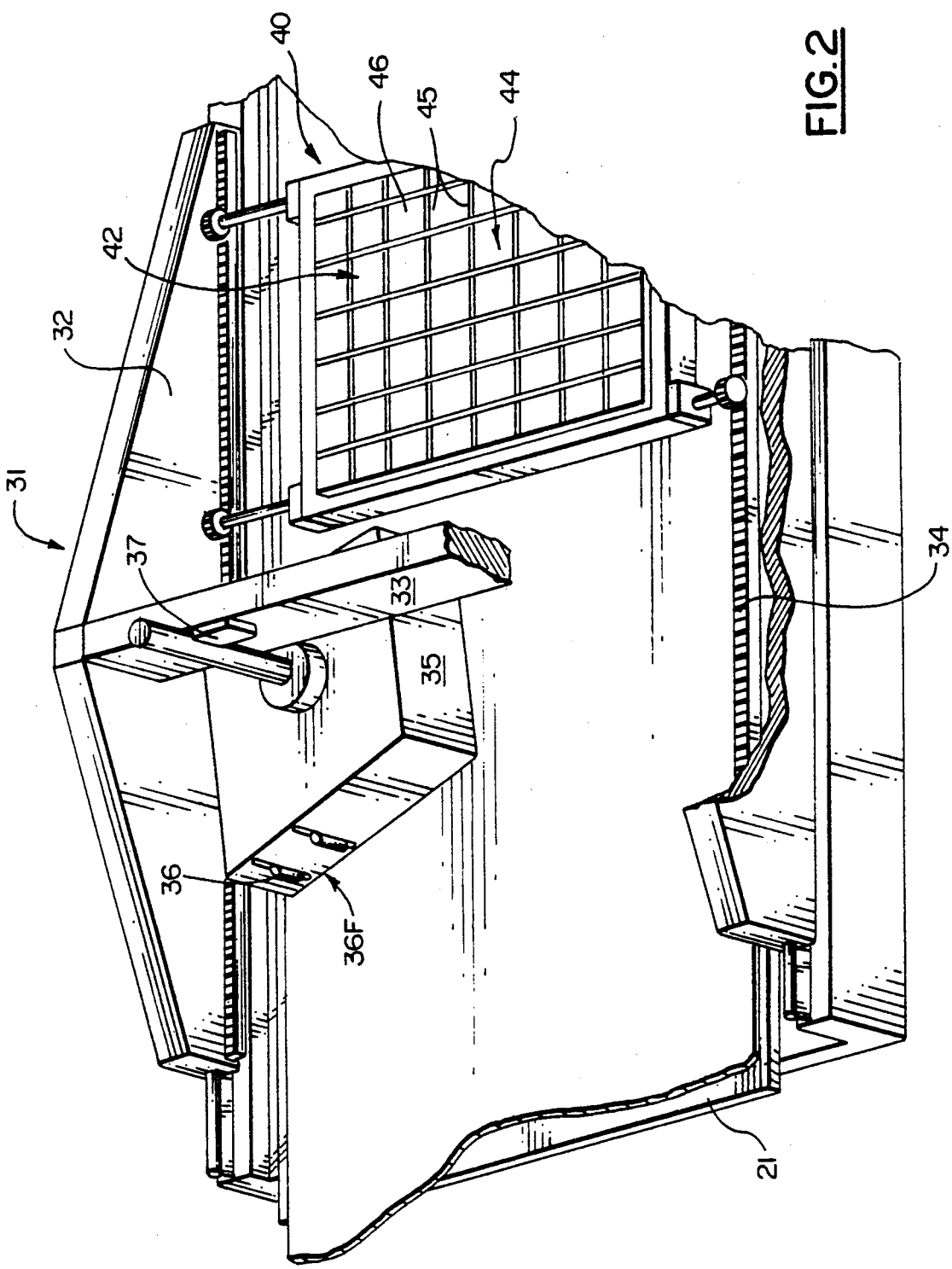

INTEGRATED, AUTOMTED COMPOSITE MATERIAL MANUFACTURING SYSTEM FOR PRE-CURE PROCESSING OF PREIMPREGNATED COMPOSITE MATERIALS

RELATED APPLICATION

The present application is related to commonly-owned, co-pending patent application Ser. No. 07/693,749, filed Apr. 30, 1991, entitled BI-FUNCTIONAL TRANSFER FOOT.

TECHNICAL FIELD

The present invention is directed to systems for manufacturing composite articles, and more particularly, to an integrated, automated manufacturing system for pre-cure processing of preimpregnated composite materials.

BACKGROUND OF THE INVENTION

Composite materials are typically comprised of a matrix of orientated fibrous material such as graphite, boron, glass, polyimides (e.g. Kevlar), and the like impregnated with an epoxy, polymeric, phenolic or other similar organic resinous material. The use of composite materials to manufacture composite articles, especially in the aerospace industry where the strength/weight ratio of composite materials provides a significant advantage over conventional materials, is on the upswing.

Composite material manufacturing systems and processes may be characterized by the nature of the composite material utilized in the system or process. Such systems or processes are generally characterized as either "prepreg" or "wet resin" systems or processes. Prepreg systems or processes utilize composite materials that are formed by impregnating woven fibrous cloth, yarn, or fiber tow with a predetermined amount of organic resin, and staging and drying the organic resin to form a partially cured ("tacky") composite material (prepreg), which is subsequently packaged in protective film. Prepreg composite material in the tacky condition is handled and processed in all the operations comprising the pre-cure fabrication phase. Wet resin systems or processes such as resin transfer molding or vacuum bagging, in contrast, utilize only the orientated fibrous material matrix in the pre-cure fabrication phase. Organic resin is injected into the orientated fibrous material matrix immediately prior to the initiation of the cure fabrication phase. Prepreg and wet resin manufacturing systems or processes each have distinct advantages and disadvantages in the manufacture of composite articles.

Composite articles may be fabricated utilizing a plurality of stacked, preimpregnated fiber plies which vary in size, shape and fiber matrix orientation. The pre-cure fabrication phase in forming composite articles typically involves several independent operations such as cutting of prepreg composite material into individual prepreg composite plies having the requisite shape, stacking or placing the cut prepreg composite plies in the mold cavity in accordance with the desired fiber orientation (layup), and forming each stacked prepreg composite ply over a mold surface contour to ensure proper compaction (debulking) of stacked prepreg composite plies, e.g., without wrinkling, during curing.

Prior art pre-cure fabrication operations are typically highly labor intensive and time consuming (and thus costly), requiring manual handing of the prepreg composite material/plies during the operations of the pre-cure fabrication phase. For example, the prepreg composite material workpiece or roll generally must be hand-placed into position, cut along guide lines to the desired shape or pattern (configuration), and hand transported to a molding station or cell where the cut prepreg composite ply is hand laid or stacked in a mold cavity. Hand pressure is utilized to conform the stacked prepreg composite ply to the mold surface contour and to tack prepreg composite plies in combination with previously stacked plies. Each prepreg composite ply typically is encased within a protective film material, which facilitates handling of individual prepreg composite plies by protecting the prepreg composite plies from contamination or sticking during handling, that must be manually removed prior to stacking of subsequent prepreg composite plies.

Various attempts have been made to reduce the adverse effects o the labor intensive operations involved in pre-cure processing of preimpregnated composite materials. Electronically controllable suction devices have been utilized for automatic handling of preimpregnated composite materials, with limited success. Such devices were configured and/or operative to match a particular prepreg ply configuration, which limited the flexibility of such devices to a single operational set-up. In addition, such devices did not readily accommodate prepreg ply configurations of exotic configuration, i.e., elaborate contours, holes, etc., of the type typically encountered in aerospace manufacturing applications. Ply transfer cycles, and inspection of ply configuration and location, was generally limited to a single ply per cycle which increased overall processing time.

Some limited success has been achieved in developing an integrated, automated system for cutting preimpregnated composite materials. Such a system automatically dispenses and cuts prepreg composite material utilizing a numerically controlled cutting machine. Cut plies are individually transferred, sans protective films, to a magazine based handling system. A loaded magazine, which constituted a kit of plies, was then delivered by conventional transfer means to a layup or stacking station or cell.

There does not appear to have been any successful attempt to develop a composite material system for pre-cure processing operations wherein the individual operations comprising the pre-cure processing phase were fully automated and integrated with one another. A need exists for an integrated, automatic composite material manufacturing system for pre-cure processing of preimpregnated composite materials. Such a system should provide efficient automatic handling of preimpregnated composite plies during all of the operations of the pre-cure processing phase and during any transfers between operations. Furthermore, the system should be integrated so that there is synchronization between the various automated pre-cure processing operations such as cutting, unloading, layup, and forming as well as any intermediate automated handling steps. In addition, the integrated, automated composite material manufacturing system should provide a high degree of quality and repeatability.

SUMMARY OF THE INVENTION

A primary object of the present invention is to provide a fully integrated, automated composite material manufacturing system for pre-cure processing of preimpregnated composite materials, preferably one-side preimpregnated composite materials.

Another object of the present invention is to provide a ply inversion subsystem for the fully integrated, automated composite material manufacturing system that is operative to invert one-sided preimpregnated composite materials or plies for further pre-cure processing.

Yet another object of the present invention is to provide a ply conforming subsystem for the fully integrated, automated composite material manufacturing system that is operative to stow the conforming means below the plane of the mold surface.

These and other objects and advantages of the present invention are provided by the fully integrated, automated composite material manufacturing (ACM$^2$) system according to the present invention. The ACM$^2$ system includes a material cutting station or cell, a material unloading station or cell, an automated, modular tray storage/transfer subsystem, a ply inversion subsystem, a ply transfer/layup subsystem, a ply conforming subsystem, a machine vision subsystem, and a computer control subsystem that is operative to provide overall, coordinated control and synchronization of and between the operations of the various functional elements comprising the ACM$^2$ system.

The ACM$^2$ system of the present invention is configured and operative to provide automatic, integrated pre-cure processing of prepreg composite materials. The ACM$^2$ system of the present invention has particular utility for pre-cure processing of prepreg composite materials that are preimpregnated on only one major surface (one-sided prepregs) in contrast to normal prepreg composite materials wherein both major surfaces are preimpregnated with resin. One-sided prepregs facilitate pre-cure processing via automated handling subsystems as described hereinbelow in further detail since the non-impregnated major surface of such one-sided prepregs is substantially free of organic resinous material, i.e., "non-tacky", and, as such, is especially amenable to automated handling by the ACM$^2$ system of the present invention.

The material cutting cell of the ACM$^2$ system is operative to cut one-sided prepreg woven graphite into individual plies of predetermined shapes or patterns, i.e., configurations, that depend upon the configuration of the composite article to be fabricated and/or the contours, i.e., configuration of the molding surface of the composite article mold. The material cutting cell includes a transfer conveyor movable between laterally spaced apart guide rails, a numerically controlled (NC) cutter, and a composite material supply means that dispenses one-sided prepreg woven graphite workpieces for the initial cutting operation effected in the material cutting cell. The supply means may be further operative to remove the protective film of the one-side graphite material so that the "non-tacky" surface of the one-side graphite material abuts the surface of the transfer conveyor.

The NC cutter includes a gantry that extends between and is movable along the guide rails. The NC cutter further includes a cutter head disposed in movable combination with the gantry so that the cutter head may be moved laterally between the guide rails. The cutter head is provided with a vertical actuator so that the elevation of the cutter head with respect to the surface of the transfer conveyor may be varied. The NC cutter is interfaced with the computer control system.

The computer control subsystem is preprogrammed with predetermined ply shapes or patterns, i.e., configurations, based upon the configuration of the composite article to be manufactured and/or the configuration of the molding surface of the composite article mold. The computer control subsystem is operative to provide automatic numerical control of the operation of the NC cutter to form one or more one-sided graphite plies each having a predetermined shape or pattern, i.e., configuration, based upon the predetermined ply configurations defined by the computer cutting program stored in the computer control subsystem.

The material unloading cell of the present invention is operative to automatically unload each group of one-sided graphite plies from the cut nest while maintaining the spatial position of the one-sided graphite plies of the group. The material unloading cell comprises a numerically controlled (NC) carriage subassembly, a numerically controlled (NC) tray handling apparatus, and a stacking tray.

The NC carriage subassembly has a configuration that includes sides structurally interconnected by a crossbeam, and a pair of tray rails formed on opposed faces of the carriage sides. The carriage sides are configured for disposition in combination with and operative for movement along the laterally spaced apart guide rails such that the NC carriage assembly is movable along the guide rails.

The NC carriage subassembly further includes a ply transfer end effector that is automatically operative to engage and retain one or more of the one-sided graphite plies of each group from the cut nest (the pickup operation), to transfer such plies to the stacking tray mounted in the NC tray handling apparatus, and to disengage and release such plies onto the stacking tray (the placement operation). The ply transfer end effector further includes an array of miniaturized, bi-functional transfer feet that are operative in predetermined combinations to effect computer controlled pickup and placement operations vis-a-vis the one-sided graphite plies within the cut nest.

The bi-functional transfer feet are disposed in combination with the ply transfer end effector in an array having a configuration optimized for interaction with one-side graphite plies having a wide variety of sizes and patterns or shapes. Each bi-functional transfer foot is individually pneumatically interconnected to a vacuum source (not shown) and a pressure source (not shown) and electrically interfaced with the computer control subsystem. Predetermined combinations of individual bi-functional transfer feet may be automatically, selectively activated, i.e., bi-functional transfer feet extended beyond the end plane of the ply transfer end effector, by the computer control subsystem, based upon the configuration of the one-sided graphite ply to be retrieved from the transfer conveyor, to define a planar operating face for the ply transfer end effector that matches the configuration(s) of the one-sided ply to be retrieved.

Thus, the configuration of the planar operating face of the ply transfer end effector may be readily modified, by means of the computer control subsystem, to automatically, selectively activate different combinations of bi-functional transfer feet to match one-sided graphite plies having a wide variety of sizes and shapes or patterns. In addition, the ply transfer end effector may be sized so that two or more distinct combinations of bi-functional transfer feet may be automatically, selectively activated by the computer control subsystem, thereby effectively forming two or more planar operating faces that may be utilized to retrieve a corresponding number of one-sided graphite plies from the transfer conveyor. Utilization of the ply transfer end effector with multiple operating faces reduces unloading cycle time, thereby enhancing the overall operating efficiency of the ACM$^2$ system of the present invention.

The operating face of the ply transfer end effector is bi-functionally operative in "ON" and "OFF" states, utilizing vacuum forces in the "ON" state to engage and retain the "tacky" surface of individual one-sided graphite plies (the pickup operation) and to utilize pneumatic pressure and mechanical forces in the "OFF" state to disengage and release the "tacky" surface of individual one-side graphite plies (the placement operation). The structural configuration of the individual bi-functional transfer feet is optimized to provide a minimum contact facial area to minimize adherence of the "tacky" surface of individual one-side graphite plies while simultaneously providing a maximum vacuum force to effect the pickup function. Each bi-functional transfer foot further includes a pressure-actuated valve body having a knock-off stem that provides the mechanical force to disengage the one-sided graphite plies from the operating face.

The ply transfer end effector is mounted in combination with and operative for lateral movement along the crossbeam. The ply transfer end effector is provided with a vertical actuator so the elevation of the ply transfer end effector may be varied with respect to the surface of the transfer conveyor. Thus, the ply transfer end effector of the NC carriage subassembly is effectively operative for longitudinal, lateral, and vertical movement with respect to each group of one-sided graphite plies transferred to the material unloading cell from the material cutting cell via the transfer conveyor. The NC carriage subassembly is interfaced with the computer control means.

The NC tray handling subassembly is disposed in combination with and movable with respect to the NC carriage subassembly via the tray rails and is operative to transfer each group of one-side graphite plies from the material unloading cell to the automated tray storage/transfer subsystem. A stacking tray is positioned on the surface of the NC tray handling subassembly. Each stacking tray is configured with an elevated grid configuration comprised of intersecting cross members that define open zones. The NC tray handling subassembly is interfaced with the computer control system.

An exemplary operating protocol for the material unloading cell of the ACM$^2$ system is controlled and synchronized by the computer control subsystem based upon the spatial coordinates stored in memory in the computer control subsystem that define the positions of the one-sided graphite plies comprising a particular group. As a group of one-sided graphite plies is transported into the material unloading cell, the computer control subsystem generates a signal to stop the transfer conveyor.

Control signals are generated by the computer control subsystem to cause longitudinal and lateral movement of the NC carriage subassembly and the ply transfer end effector, respectively, to position the ply transfer end effector over one of the one-sided graphite plies. Another set of control signals lowers the ply transfer end effector to a position adjacent the one-side graphite ply, activates (extends) the respective vacuum-actuated transfer feet, which in combination define an operating face that matches the configuration of the one-sided graphite ply to be picked up, and actuates the respective vacuum-actuated transfer feet forming the operating face to implement the pickup operation.

A subsequent set of control signals raises the ply transfer end effector holding the one-sided graphite ply, and simultaneously causes a synchronized longitudinal movement of the NC tray handling apparatus to position the stacking tray underneath the elevated ply transfer end effector. Another set of control signals lowers the ply transfer end effector, as required, to place the one-sided graphite ply onto the elevated grid structure of the stacking tray, implements the placement operation to mechanically disengage the one-side graphite ply from the operating face, and causes the respective bi-functional transfer feet forming the operating face to retract into the ply transfer end effector. A control signal then moves the NC tray handling apparatus out of the field of the ply transfer end effector.

The operating protocol described hereinabove is repeated as necessary until all one-side graphite plies comprising a given group have been placed on the stacking tray. The unloading cycle time may be reduced by utilizing the ply transfer end effector in the multiple operating face configuration as described hereinabove.

Once the stacking tray has been loaded with the one-sided graphite plies comprising a group, the loaded stacking tray is transferred to the automated tray storage/transfer subsystem. One embodiment of the automated tray storage/transfer subsystem may comprise an automated lift table of the type known to those skilled in the art. The automated lift table is operative to align different levels of a storage/transfer container with the NC tray handling apparatus to facilitate automatic loading of loaded storage trays from the NC tray handling apparatus to the storage/transfer container and automatic unloading of empty storage trays from the storage/transfer container onto the NC tray handling apparatus.

Another embodiment of an automated tray storage/transfer subsystem for the ACM$^2$ system is a modular subsystem that includes a robotic transfer arm, a plurality of storage/transfer containers, at least one automatically controlled mobile vehicle interconnected to the computer control subsystem, and guide means for defining transport routes for the automatically controlled mobile vehicle(s). The automated tray storage/transfer subsystem is operative to store loaded stacking trays and to deliver loaded stacking trays to a temporary storage area, to subsequent pre-cure processing station(s), and/or between the temporary storage area and subsequent pre-cure processing station(s).

The computer control subsystem controls the operation of the robotic transfer arm which is operative to transfer a loaded stacking tray from the NC tray handling apparatus to a storage/transfer container prepositioned at the end of the material unloading cell, and to subsequently transfer an empty stacking tray from the storage/transfer container to the NC tray handling apparatus.

Each storage/transfer container includes a predetermined plurality of paired magazine supports such that each storage/transfer container has a capacity to store a predetermined number of loaded stacking trays. Each pair of magazine supports defines a predetermined storage location for one loaded stacking tray. The robotic transfer arm provides a feedback signal for each individual loaded stacking tray transferred to the prepositioned storage/transfer container to update the memory of the computer control subsystem with the current storage location of individual loaded stacking trays in a particular storage/transfer container.

Once the prepositioned storage/transfer container is loaded, the computer control subsystem generates a set of signals to transfer the prepositioned storage/transfer container to the mobile vehicle and to preposition an empty storage/transfer container at the end of the material unloading cell. The computer control subsystem directs the subsequent movement of the mobile vehicle transporting the loaded storage/transfer container along the guide means to the temporary storage area or a subsequent pre-cure processing station, as required.

The ply inversion subsystem is operative to invert the one-sided graphite plies so that the "tacky" surface thereof is properly disposed for the conforming operation of the pre-cure processing phase effected by the $ACM^2$ system of the present invention. The structural configuration of the ply inversion subsystem is optimized to minimize adherence of the "tacky" surface of the one-side graphite plies to the operating elements comprising the ply inversion subsystem which interact with the "tacky" surface.

The ply inversion subsystem includes a robotic transfer arm interconnected with the computer control subsystem, a workpiece support structure, and a vacuum-activated inverter assembly. The workpiece support structure includes a workpiece support table and an inverter assembly support frame. The workpiece support table is configured to support a loaded stacking tray. Control signals from the computer control subsystem activate the automated tray storage/transfer subsystem to position a loaded storage/transfer container adjacent the robotic transfer arm, which is operatively controlled by the computer control subsystem to transfer a predetermined loaded stacking tray onto the the workpiece support table. The inverter assembly support frame of the workpiece support structure is configured to support the vacuum-activated inverter assembly.

An automatic rotational means such as a motor-driven hinge is mounted intermediate the workpiece support table and the inverter assembly support frame and structurally interconnected to the vacuum-activated inverter assembly. The hinge means is operative, under the control of the computer control subsystem via interconnection means, to rotate the vacuum-activated inverter assembly through a 180° rotational range between a first position adjacent the workpiece support structure and a second position adjacent the inverter assembly support frame.

The vacuum-activated inverter assembly of the ply inversion subassembly comprises a vacuum plenum that includes an interactive surface structure and an internal inverter mechanism. The interactive surface structure includes an elevated grid pattern formed by intersecting wedge-shaped members. The wedge-shaped members are formed from a compliant material such as silicone or sponge rubber and are operative to be compressed during pickup and inversion operations so that the wedge-shaped members function as a sealing structure when disposed in abutting engagement with the loaded stacking tray. The wedge-shaped configuration of the members minimizes physical contact between the wedge-shaped members and the "tacky" surface of the one-sided graphite plies. The intersecting wedge-shaped members form a plurality of structural nodes and define a plurality of sensor zones. Each sensor zone has a predetermined area defined by the spacing between respective wedge-shaped members. A sensor bore of predetermined diameter extends through the interactive surface structure in the center of each sensor zone, and a disengagement bore of predetermined diameter extends through each structural node.

The internal inverter mechanism includes a movable backing plate, a plurality of servo cylinders and springs for regulating the movement of the backing plate, and a plurality of disengagement pins rigidly secured to the backing plate. The disengagement pins have a configuration such that the disengagement pins are slidably moveable within the disengagement bores, and, with the backing plate in a neutral position, the free ends of the disengagement pins are substantially coplanar with the surface of the interactive surface structure.

The internal inverter mechanism further includes a vacuum manifold that provides a fluidic interconnection between a vacuum source and a plurality of vacuum ports. Each vacuum port fluidically interfaces with a vacuum valve consisting of a valve body having an integral sensor stem depending therefrom. Each sensor stem is configured for sliding movement within a corresponding sensor bore, and has a length such that the free end thereof lies in a plane parallel to and above the apex plane defined by the wedge-shaped members.

An operating protocol for the ply inversion subsystem described in the preceding paragraphs is described in the following paragraphs. Once the loaded stacking tray is positioned upon the workpiece support table, the computer control subsystem generates a control signal to activate the automatic rotational means to rotate the vacuum-activated inverter assembly from the second position (in abutting engagement with the inverter assembly support frame as a result of a prior inversion operation) through the 180° rotational range to the first position wherein the interactive surface structure is in abutting engagement with the loaded stacking tray.

As the vacuum-activated inverter assembly transitions through the last few degrees of the rotational range, sensor stems in alignment with the one-sided graphite plies on the elevated grid structure of the loaded stacking tray contact the "tacky" surface of respective one-sided graphite plies and are linearly displaced as a result of such contact, such displacement causing corresponding displacement of respective valve bodies. Displacement of the valve bodies actuates the corresponding vacuum valves with the result that vacuum forces are exerted in the corresponding sensor zones. With the interactive surface structure in the first position (in abutting engagement with the loaded stacking tray), the "activated" sensor zones operate as vacuum cells delimited and sealed by means of the apices of the corresponding wedge-shaped structural members engaging the "tacky" surface of the one-sided graphite plies.

The combined vacuum forces exerted by the "activated" sensor zones in response to activation of corresponding vacuum valves is sufficient in magnitude to engage and retain the one-side graphite plies in contact with the interactive surface structure of the vacuum-activated inverter assembly ("tacky" surface in facing relation to the interactive surface structure). Sensor stems not in alignment with the one-sided graphite plies rotate into the open zones of the elevated grid structure, and, in consequence, are not subjected to linear displacement. Accordingly, the corresponding vacuum valves are not activated and the associated sensor zones are quiescent, i.e., do not generate vacuum forces.

The computer control subsystem next generates a control signal to rotate the vacuum-activated inverter assembly from the first position through the 180° rotational range into the second position wherein the vacuum-activated inverter assembly is in abutting engagement with the inverter assembly support frame. In this position, the "non-tacky" surface of the one-side graphite plies are exposed for further pre-cure processing by means of the ACM$^2$ system of the present invention. At this point, another control signal from the computer control subsystem causes a termination of the vacuum forces (for example, by temporarily bleeding the vacuum manifold) such that the one-sided graphite plies are supported solely by the apices of respective wedge-shaped members and the disengagement pins. At this point the computer control subsystem may also be operative to activate the robotic transfer arm to position another loaded stacking tray onto the workpiece support table for a subsequent inversion operation.

An important attribute of any automated composite material manufacturing system is the maintenance of composite article quality and repeatability. Quality and repeatability may be adversely effected by induced position errors that cause a non-correspondence between the spatial coordinates stored in memory of the computer control subsystem and the "true" position of the one-sided graphite plies on the interactive surface structure, i.e., the stored spatial coordinates represent only the approximate positions of the one-side graphite plies on the interactive surface structure.

To provide quality and repeatability in pre-cure processing operations, the ACM$^2$ system of the present invention may include a machine vision subsystem. The machine vision subsystem is operative, in combination with the computer control subsystem, to provide precise spatial coordinates representing the exact locations of the one-sided graphite plies on the interactive surface structure to the ply transfer/layup subsystem. The machine vision subsystem is further operative to verify that each one-sided graphite ply has been removed from the interactive surface structure during operation of the ply transfer/layup subsystem.

The machine vision subsystem for the ACM$^2$ system includes one or more video cameras positioned so that the field of view thereof encompasses the interactive surface structure and operative to generate video images of the one-sided graphite plies on the interactive surface structure, and interface means such as wiring for interconnecting the video camera(s) to the computer control subsystem. The components and operation of such machine vision subsystems are generally know to those skilled in the art, and accordingly, are not described in further detail herein.

The computer control subsystem is preprogrammed to control the operation of the machine vision subsystem. The computer control subsystem activates the machine vision subsystem to search predetermined windows defined with respect to the interactive surface structure. The predetermined search windows are based upon the spatial coordinates stored in memory of the computer control subsystem. The use of predetermined search windows provides the machine vision subsystem with the capability to to isolate and image specific individual one-sided graphite plies. The size of the search windows may be defined to accommodate induced position errors of predetermined magnitude.

Video images of the configuration of individual one-sided graphite plies generated by the machine vision subsystem are transmitted to the computer control subsystem for further processing. The processing techniques performed by the computer control subsystem are executed utilizing electronic subsystems and software programs generally know to those skilled in the art.

The computer control subsystem digitally processes the video configuration images generated by the machine vision subsystem to provide digitized configuration images that correspond to the video configuration images. The digitized configuration image of each one-side graphite ply may then be enhanced one or more times by the computer control subsystem to maximize the accuracy, i.e., definition, of the outline of such digitized configuration image. The enhanced digitized configuration image may then be subjected to further processing by the computer control subsystem so that specified features of the enhanced, digitized configuration image are isolated for precise position computations. The specified features are also further processed by the computer control subsystem to verify the size and shape or pattern of each one-side graphite ply on the interactive surface structure.

Generally, straight edge portions of the enhanced, digitized configuration image are selected as the specified feature(s) as computational analysis is easiest for straight edge portions and straight edge portions are generally inherent in the configuration of most one-side graphite plies. It will be appreciated, however, that other features of the configuration of the individual one-side graphite plies, such as curved portions, corners, holes, etc., may be selected as the specified feature for computational analysis, depending upon the overall configuration of a specific one-sided graphite ply.

Once the computed positions of the specified feature(s) of each enhanced, digitized configuration image have been determined, the "true" position of each one-sided graphite ply on the interactive surface structure is utilized by the computer control subsystem to control the operation of the ply transfer/layup subsystem. In one embodiment, the computer control subsystem compares the computed positions of the specified features against the positions of specified features stored in memory, and computes an off-set representing the "true" position of the individual one-sided graphite plies that is utilized by the computer control subsystem to control the operation of the ply transfer/layup subsystem. Alternatively, the computer control subsystem may utilize the computed positions to "correct" the original position information stored in memory, by utilizing conventional mathematical techniques, so that the position information stored in memory represents the "true" position of the one-sided graphite plies on the interactive surface structure.

The ply transfer/layup subsystem is operative, under the control of the computer control subsystem which provides signals representing the "true" position of the one-sided graphite plies on the interactive surface structure, to pickup individual one-sided graphite plies from the interactive surface structure, to transfer such one-sided graphite plies to the composite article mold (which is located with the ply conforming subsystem), and to layup such one-sided graphite plies on the corresponding portions of the molding surface of the composite article mold. The transfer and layup operations are controlled by the computer control subsystem based upon the "true" position of each one-side graphite ply and the known spatial coordinates of the mold surface of the composite article mold which have been preprogrammed in memory of the computer control subsystem.

The ply transfer/layup subsystem for the ACM² system is a robotic system that comprises a stationary gantry having spaced apart rails, a cross-member disposed in combination with and operative for movement along said spaced apart rails, a telescoping arm disposed in combination with and operative for movement along the cross-member, and a ply transfer end effector disposed in combination with and operative for rotational movement with respect to the telescoping arm. The ply transfer end effector is thus effectively operative for longitudinal, lateral, vertical, and rotational movement with respect to the one-sided graphite plies on the interactive surface structure and with respect to the molding surface of the composite article mold.

The ply transfer end effector may embody a structural configuration and be functionally equivalent to the ply transfer end effector described hereinabove, including the bi-functional transfer feet. Such commonality of components provides some advantages for the ACM² system of the present invention. It will be appreciated, however, that the ply transfer end effectors of the ply transfer/layup subsystem interact with the "non-tacky" surfaces of the one-sided graphite plies. Therefore, the ply transfer end effector does not require vacuum-actuated transfer feet that include mechanical stems to disengage the one-sided graphite plies. Rather, the termination of vacuum pressure exerted the vacuum-actuated transfer feet of the ply transfer end effector will result in the release of the "non-tacky" surface of the one-sided graphite plies.

Operationally, in response to "true" position signals provided by the computer control subsystem, the ply transfer end effector is precisely positioned over the one-sided graphite ply to be picked up from the interactive surface structure. Another set of control signals lowers the ply transfer end effector to a position adjacent the one-side graphite ply, activates (extends) the respective vacuum-actuated transfer feet, which in combination define an operating face that matches the configuration of the one-sided graphite ply to be picked up, and actuates the respective vacuum-actuated transfer feet forming the operating face to implement the pickup operation.

A subsequent set of control signals raises the ply transfer end effector holding the one-sided graphite ply, and simultaneously moves the ply transfer end effector over the appropriate portion of the mold surface of the composite article mold. Once the ply transfer end effector is properly positioned, another set of control signals lowers the ply transfer end effector, as required, to place the one-sided graphite ply onto the appropriate mold surface, implements the placement operation to either mechanically disengage the one-side graphite ply from the operating face or terminates the vacuum pressure to release the one-side graphite ply, and causes the respective vacuum-actuated transfer feet forming the operating face to retract into the ply transfer end effector.

The operating protocol described hereinabove is repeated as necessary until all one-side graphite plies comprising a given group have been removed from the interactive surface structure and layed up on the mold surface. The transfer/layup cycle time may be reduced by utilizing the ply transfer end effector in the multiple operating face configuration.

The ply conforming subsystem for the ACM² system is operative to conform the layed-up one-side graphite plies to the mold surface by means of vacuum pressure applied through a compliant bladder. Inasmuch as the compliant bladder may be adversely affected or degraded by contact with the organic resin of the preimpregnated composite materials, one-sided graphite plies are the preferred material for the ACM² system of the present invention. In addition, the use of one-sided graphite plies facilitates removal of the compliant bladder from the mold surface after the conforming operation. The ply conforming subsystem of the present invention has a structural configuration that is conducive for integrated operation in combination with the ply transfer/layup subsystem.

The ply conforming subsystem includes a support table that provides support for the composite article mold having a predetermined mold surface, a frame member supporting a flexible, impervious membrane or bladder, a wedge-shaped seal disposed about the mold that is operative to provide sealing between the bladder and the support table, and a four-bar linkage mounting assembly for structurally interconnecting the support table and the frame member. Each link member is pivotally mounted at one end to the support table and pivotally mounted at the other end to the frame member. At least two of the link members have ends extending above the plane of the mold surface. A drive motor, interfaced with the computer control subsystem, is operatively interconnected to the four-bar linkage mounting assembly.

Control signals generated by the computer control subsystem activate the drive motor to cause rotation of the four bar linkage mounting assembly to alternately rotate the frame member to a displaced position and a contact position. In the contact position, the bladder is disposed in sealed combination with the support table so that the bladder may be vacuumized to conform the layed-up one-side graphite plies to the mold surface. In the displaced position, the frame member and bladder are stowed below the plane of the mold surface. Such a stowage position permits the ply transfer/layup subsystem to have full access to the mold surface.

The computer control subsystem may be any of the various types of computers generally utilized for control of automated manufacturing systems.

BRIEF DESCRIPTION OF THE DRAWINGS

A more complete understanding of the present invention and the attendant features and advantages thereof may be had by reference to the following detailed description when considered in conjunction with the accompanying drawings wherein:

FIG. 1 is a perspective view illustrating an embodiment of an automated composite material manufacturing system according to the present invention.

FIG. 2 is a partial perspective view of a material unloading cell of the automated composite material manufacturing system of FIG. 1.

FIG. 3 illustrates a magazine support for storage/transfer containers utilized in the automated composite material manufacturing system of FIG. 1.

DETAILED DESCRIPTION OF PREFERRED EMBODIMENTS

Figure 4:
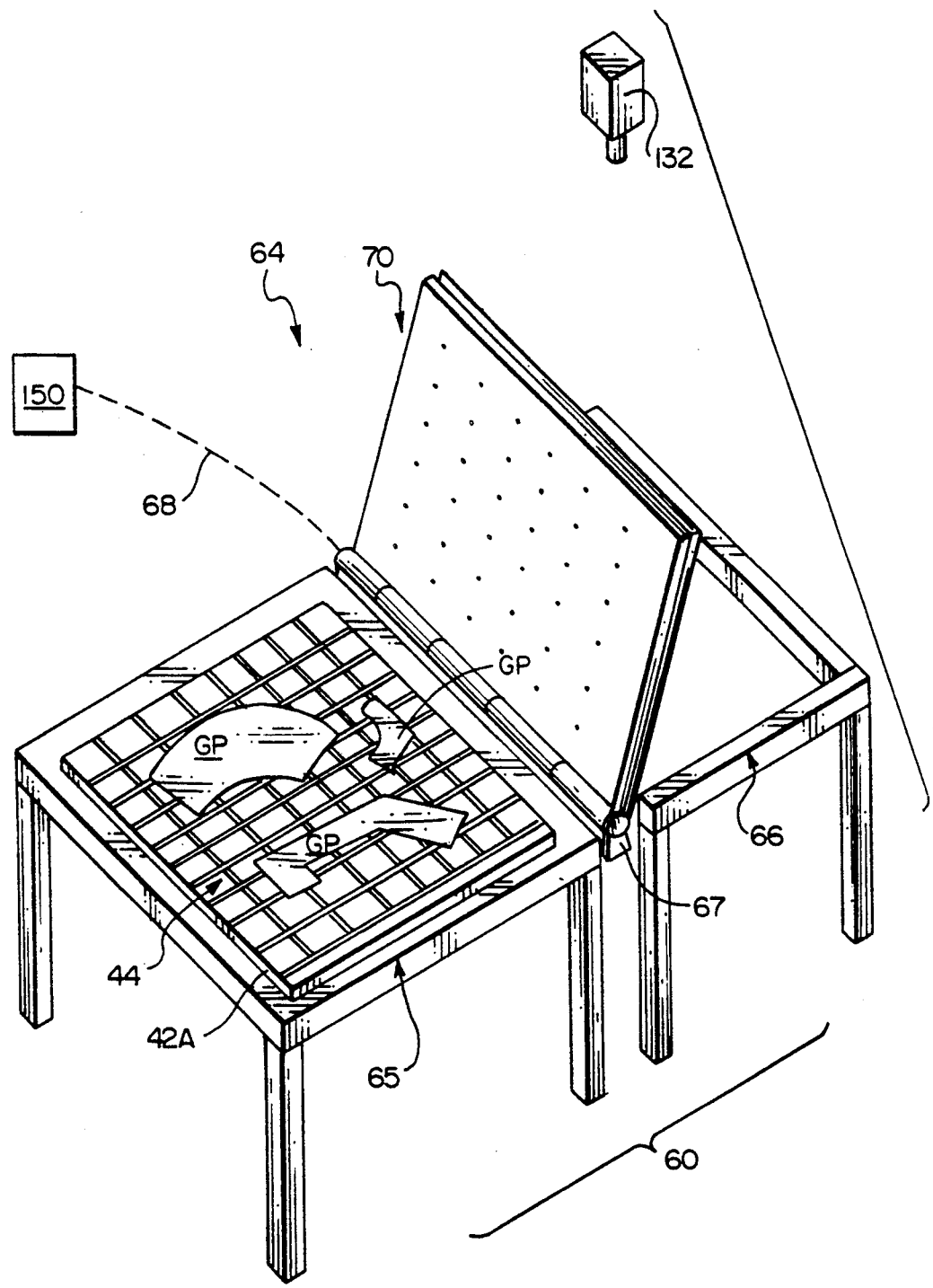
FIG. 4 is a perspective view of a ply inversion subsystem for the automated composite material manufacturing system of FIG. 1.

Referring now to the drawings wherein like reference numerals identify corresponding or similar elements throughout the several views, FIG. 1 is a perspective overview of one embodiment of an automated composite material manufacturing (ACM$^2$) system 10 according to the present invention. The ACM$^2$ system 10 includes a material cutting station or cell 20, a material unloading station or cell 30, an automated, modular tray storage/transfer subsystem 50, a ply inversion subsystem 60, a ply transfer/layup subsystem 90, a ply conforming subsystem 110, a machine vision subsystem 130, and a computer control subsystem 150 that is operative to provide overall, coordinated control and synchronization of and between the operations of the various functional elements comprising the ACM$^2$ system 10.

The ACM$^2$ system 10 of the present invention is configured and operative to provide automatic, integrated pre-cure processing of prepreg composite materials. The ACM$^2$ system 10 of the present invention has particular utility for pre-cure processing of prepreg composite materials that are preimpregnated on only one major surface (one-sided prepregs) in contrast to normal prepreg composite materials wherein both major surfaces are preimpregnated with resin. One-sided prepregs facilitate pre-cure processing via automated handling subsystems as described hereinbelow in further detail since the non-impregnated major surface of such one-sided prepregs is substantially free of organic resinous material, i.e., "non-tacky", and, as such, is especially amenable to automated handling by the ACM$^1$ system 10 of the present invention. Such a one-sided prepreg composite material is described and claimed in commonly-owned, co-pending U.S. patent application Ser. No. 07/410,441. The structural and functional features of the ACM$^2$ system 10 are described in further detail hereinbelow in terms of one-sided prepreg woven graphite, but it is to be understood that the ACM$^2$ system 10 of the present invention has utility in pre-cure processing of other types of one-side prepreg woven composite materials that are typically used to form composite articles, for example, resin impregnated polyimides such as Kevlar. The ACM$^2$ system 10 of the present invention may be adapted for use with conventional prepreg composite materials, i.e., two-sided prepregs, of the type typically utilized to manufacture composite articles.

The material cutting cell 20 of the ACM$^2$ system 10 is operative to cut one-sided prepreg woven graphite into individual plies of predetermined shapes or patterns, i.e., configurations, that depend upon the configuration of the composite article to be fabricated and/or the contours, i.e., configuration of the molding surface of the composite article mold. The material cutting cell 20 includes a transfer conveyor 21 movable between laterally spaced apart guide rails 22, a numerically controlled (NC) cutter 23, and a composite material supply means 28 that dispenses one-sided prepreg woven graphite GM workpieces for the initial cutting operation effected in the material cutting cell 20. As illustrated in FIG. 1, the supply means 28, which includes a roll of prepreg woven graphite GM, is operative to automatically dispense one-sided graphite GM workpieces onto the surface of the transfer conveyor 21 with the "tacky" surface of of the one-sided graphite material GM facing upwardly. The supply means 28 may be further operative to remove the protective film of the one-side graphite material GM so that the "non-tacky" surface of the one-side graphite material GM abuts the surface of the transfer conveyor 21. The surface of the transfer conveyor 21 may be coated with a material such as teflon. It will be appreciated that the supply means 28 may have other functional configurations, as for example, a configuration that is operative to automatically dispense individual sheet-type workpieces of prepreg woven graphite GM from a storage container onto the transfer conveyor 21.

The NC cutter 23 includes a gantry 24 that extends between and is movable along the guide rails 22 (in a longitudinal direction). The NC cutter 23 further includes a cutter head 25 disposed in movable combination with the gantry 24 so that the cutter head 25 may be moved laterally between the guide rails 22. The cutter head 25 is provided with a vertical actuator 26 so that the elevation of the cutter head 25 with respect to the surface of the transfer conveyor 21 may be varied. The NC cutter 23 is interfaced with the computer control system 150 by any conventional means such as wiring 27.

The computer control subsystem 150 is preprogrammed with predetermined ply shapes or patterns, i.e., configurations, based upon the configuration of the composite article to be manufactured and/or the configuration of the molding surface of the composite article mold. The computer control subsystem 150 is operative to provide automatic numerical control of the operation of the NC cutter 23 to form one or more one-sided graphite plies GP each having a predetermined shape or pattern, i.e., configuration, based upon the predetermined ply configurations defined by the computer cutting program stored in the computer control subsystem 150.

Each cutting operation defines one group Gr of one-sided graphite plies GP. Depending upon the configuration and size of the composite article to be manufactured and the configuration of the molding surface of the composite article mold, the cutting and unloading operations are preferably optimized so that each group Gr of one-sided graphite plies GP comprises the composite article to be manufactured, i.e., the layup comprised of multiple, superimposed layers of one-side graphite plies GP. Alternatively, each group Gr of one-side graphite plies GP may comprise a single layup (layer) of the composite article to be manufactured, or a defined subsegment thereof.

As exemplarily illustrated in FIG. 1, each group Gr of one-sided graphite plies GP remains nested within the one-sided graphite material GM workpiece for transfer to the material unloading cell 30 by means of the transfer conveyor 21, which extends into and through the material unloading cell 30 from the material cutting cell 20. The spatial coordinates that define the position, i.e., location, orientation, and overall configuration of the one-side graphite plies GP comprising the group Gr with respect to the first transfer conveyor 21 and with respect to one another are known quantities based upon the numerical control provided by the computer control subsystem 150.

The material unloading cell 30 of the present invention is operative to automatically unload each group Gr of one-sided graphite plies GP from the cut nest while maintaining the spatial position of the one-sided graphite plies GP of the group Gr. The material unloading cell 30 comprises a numerically controlled (NC) carriage subassembly 31, a numerically controlled (NC) tray handling apparatus 40, and a stacking tray 42 as exemplarily illustrated in FIGS. 1, 2.

With reference to FIG. 2, the NC carriage subassembly 31 has a configuration that includes sides 32 structurally interconnected by a crossbeam 33, and a pair of tray rails 34 formed on opposed faces of the carriage sides 32. The carriage sides 32 are configured for disposition in combination with and operative for movement along the laterally spaced apart guide rails 22 such that the NC carriage assembly 31 is movable along the guide rails 22 (in the longitudinal direction).

The NC carriage subassembly 31 further includes a ply transfer end effector 35 that is automatically operative to engage and retain one or more of the one-sided graphite plies GP of each group Gr from the cut nest (the pickup operation), to transfer such plies GP to the stacking tray 42 mounted in the NC tray handling apparatus 40, and to disengage and release such plies GP onto the stacking tray 42 (the placement operation). The ply transfer end effector 35 further includes an array of miniaturized, bi-functional transfer feet 36 that are operative in predetermined combinations to effect computer controlled pickup and placement operations vis-a-vis the one-sided graphite plies GP within the cut nest.

The bi-functional transfer feet 36 are disposed in combination with the ply transfer end effector 35 in an array having a configuration optimized for interaction with one-side graphite plies GP having a wide variety of sizes and patterns or shapes. Each bi-functional transfer foot 36 is individually pneumatically interconnected to a vacuum source (not shown) and a pressure source (not shown) and electrically interfaced with the computer control subsystem 150. Predetermined combinations of individual bi-functional transfer feet 36 may be automatically, selectively activated, i.e., bi-functional transfer feet 36 extended beyond the end plane of the ply transfer end effector 35, by the computer control subsystem 150, based upon the configuration of the one-sided graphite ply GP to be retrieved from the transfer conveyor 21, to define a planar operating face 36F for the ply transfer end effector 35 that matches the configuration(s) of the one-sided ply GP to be retrieved.

Thus, the configuration of the planar operating face 36F of the ply transfer end effector 35 may be readily modified, by means of the computer control subsystem 150, to automatically, selectively activate different combinations of bi-functional transfer feet 36 to match one-sided graphite plies GP having a wide variety of sizes and shapes or patterns. In addition, the ply transfer end effector 35 may be sized so that two or more distinct combinations of bi-functional transfer feet 36 may be automatically, selectively activated by the computer control subsystem 150, thereby effectively forming two or more planar operating faces 36F that may be utilized to retrieve a corresponding number of one-sided graphite plies GP from the transfer conveyor 21. Utilization of the ply transfer end effector 35 with multiple operating faces 36F reduces unloading cycle time, thereby enhancing the overall operating efficiency of the $ACM^2$ system of the present invention.

The operating face 36F of the ply transfer end effector 35 is bi-functionally operative in "ON" and "OFF" states, utilizing vacuum forces in the "ON" state to engage and retain the "tacky" surface of individual one-sided graphite plies GP (the pickup operation) and to utilize pneumatic pressure and mechanical forces in the "OFF" state to disengage and release the "tacky" surface of individual one-side graphite plies GP (the placement operation). The bi-functional transfer feet 36 for the ply transfer end effector 35 are claimed and described in further detail in commonly-owned, co-pending patent application Ser. No. 07/693,749, filed Apr. 30, 1991 entitled BI-FUNCTIONAL TRANSFER FOOT. The structural configuration of the individual bi-functional transfer feet 36 is optimized to provide a minimum contact facial area to minimize adherence of the "tacky" surface of individual one-side graphite plies GP while simultaneously providing a maximum vacuum force to effect the pickup function. Each bi-functional transfer foot 36 further includes a pressure-actuated valve body having a knock-off stem that provides the mechanical force to disengage the one-sided graphite plies GP from the operating face 36F.

The ply transfer end effector 35 is mounted in combination with and operative for lateral movement along the crossbeam 33. The ply transfer end effector 35 is provided with a vertical actuator 37 so the elevation of the ply transfer end effector 35 may be varied with respect to the surface of the transfer conveyor 21. Thus, the ply transfer end effector 35 of the NC carriage subassembly 31 is effectively operative for longitudinal, lateral, and vertical movement with respect to each group Gr of one-sided graphite plies GP transferred to the material unloading cell 30 from the material cutting cell 20 via the transfer conveyor 21. The NC carriage subassembly 31 is interfaced with the computer control means 150 by any conventional means such as wiring 39.

The NC tray handling subassembly 40 is disposed in combination with and movable with respect to the NC carriage subassembly 31 (in the longitudinal direction) via the tray rails 34 and is operative to transfer each group Gr of one-side graphite plies GP from the material unloading cell 30 to the automated tray storage/transfer subsystem 50. A stacking tray 42 is positioned on the surface of the NC tray handling subassembly 40 as exemplarily illustrated in FIG. 2. Each stacking tray 42 is configured with an elevated grid configuration 44 comprised of intersecting cross members 45 that define open zones 46. The function of the elevated grid structure 44 will be described in further detail hereinbelow. The NC tray handling subassembly 40 is interfaced with the computer control system 150 by any conventional means such as wiring 41.

An exemplary operating protocol for the material unloading cell 30 of the $ACM^2$ system 10 is described in the following paragraphs. The operation of the material unloading cell 30 is controlled and synchronized by the computer control subsystem 150 based upon the spatial coordinates stored in memory in the computer control subsystem 150 that define the positions of the one-sided graphite plies GP comprising a particular group Gr. As a group Gr of one-sided graphite plies GP is transported into the material unloading cell 30, the computer control subsystem 150 generates a signal to stop the transfer conveyor 21.

Control signals are generated by the computer control subsystem 150 to cause longitudinal and lateral movement of the NC carriage subassembly 31 and the ply transfer end effector 35, respectively, to position the ply transfer end effector 35 over one of the one-sided graphite plies GP. Another set of control signals lowers the ply transfer end effector 35 to a position adjacent the one-side graphite ply GP, activates (extends) the respective vacuum-actuated transfer feet 36, which in combination define an operating face 36F that matches the configuration of the one-sided graphite ply GP to be picked up, and actuates the respective vacuum-actuated transfer feet 36 forming the operating face 36F to implement the pickup operation.

A subsequent set of control signals raises the ply transfer end effector 35 holding the one-sided graphite ply GP, and simultaneously causes a synchronized longitudinal movement of the NC tray handling apparatus 40 to position the stacking tray 42 underneath the elevated ply transfer end effector 35. Another set of control signals lowers the ply transfer end effector 35, as required, to place the one-sided graphite ply GP onto the elevated grid structure 44 of the stacking tray 42, implements the placement operation to mechanically disengage the one-side graphite ply GP from the operating face 36F, and causes the respective vacuum-actuated transfer feet 36 forming the operating face 36F to retract into the ply transfer end effector 35. A control signal then moves the NC tray handling apparatus 40 out of the field of the ply transfer end effector 35.

The operating protocol described hereinabove is repeated as necessary until all one-side graphite plies GP comprising a given group Gr have been placed on the stacking tray 42. The unloading cycle time may be reduced by utilizing the ply transfer end effector 35 in the multiple operating face 36F configuration as described hereinabove. A refuse bin B is positioned at the end of the material unloading cell 30 to receive the unused portion of the prepreg graphite material GM workpieces.

Once the stacking tray 42 has been loaded with the one-sided graphite plies GP comprising a group Gr, the loaded stacking tray 42 is transferred to the automated tray storage/transfer subsystem 50. One embodiment of the automated tray storage/transfer subsystem 50 may comprise an automated lift table of the type known to those skilled in the art. The automated lift table 50 is operative to align different levels of a storage/transfer container 54, as described in further detail hereinbelow, with the NC tray handling apparatus 40 to facilitate automatic loading of loaded storage trays 42 from the NC tray handling apparatus 40 to the storage/transfer container 54 and automatic unloading of empty storage trays 42 from the storage/transfer container 54 onto the NC tray handling apparatus 40.

Another embodiment of an automated tray storage/transfer subsystem 50 for the ACM² system 10 is illustrated in FIG. 1 and is a modular subsystem that includes a robotic transfer arm 52, a plurality of storage/transfer containers 54, at least one automatically controlled mobile vehicle 56 interconnected to the computer control subsystem 150 by any conventional means such as wiring 57, and guide means 58 for defining transport routes for the automatically controlled mobile vehicle(s) 56. The automated tray storage/transfer subsystem 50 is operative to store loaded stacking trays 42 and to deliver loaded stacking trays 42 to a temporary storage area, to subsequent pre-cure processing station(s), and/or between the temporary storage area and subsequent pre-cure processing station(s). For the ACM² system 10 illustrated in FIG. 1, the subsequent pre-cure processing station(s) comprises one or more ply inversion subsystems 60, as described hereinbelow in further detail. (An ACM² system 10 employing multiple ply inverter subsystems 60 would have such subsystems disposed in parallel, in combination with respective ply transfer/layup subsystems 90, ply conforming subsystems 110, and machine vision subsystems 130, to provide an increased output of finished composite articles.).

The robotic transfer arm 52 is schematically illustrated in FIG. 1, the configuration and operation of robotic transfer arms 52 being generally known to those skilled in the art. The robotic transfer arm 52 is interconnected to the computer control subsystem 150 by any conventional means such as wiring 53. The computer control subsystem 150 controls the operation of the robotic transfer arm 52 which is operative to transfer a loaded stacking tray 42 from the NC tray handling apparatus 40 to a storage/transfer container 54A prepositioned at the end of the material unloading cell 30, and to subsequently transfer an empty stacking tray 42 from the storage/transfer container 54A to the NC tray handling apparatus 40.

Each storage/transfer container 54 includes a predetermined plurality of paired magazine supports 55 (see FIG. 3) such that each storage/transfer container 54 has a capacity to store a predetermined number of loaded stacking trays 42. Each pair of magazine supports 55 defines a predetermined storage location for one loaded stacking tray 42. The robotic transfer arm 52 provides a feedback signal for each individual loaded stacking tray 42 transferred to the prepositioned storage/transfer container 54A to update the memory of the computer control subsystem 150 with the current storage location of individual loaded stacking trays 42 in a particular storage/transfer container 54.

Once the prepositioned storage/transfer container 54 is loaded, the computer control subsystem 150 generates a set of signals to transfer the prepositioned storage/transfer container 54A to the mobile vehicle 56 and to preposition an empty storage/transfer container 54 at the end of the material unloading cell 30. The computer control subsystem 150 directs the subsequent movement of the mobile vehicle 56 transporting the loaded storage/transfer container 54 along the guide means 58 to the temporary storage area or a subsequent pre-cure processing station, as required.

The placement operation described hereinabove results in individual one-sided graphite plies GP being placed on individual stacking trays 42 with the "tacky" surface of the one-sided graphite plies GP are facing upwardly (with respect to the stacking tray 42). This disposition of the one-sided graphite plies GP is the most advantageous for the various automated, pre-cure processing operations described hereinabove in that it ensures that the "tacky" surface of the one-sided graphite plies GP does not interfere with the various automated procedures and/or transfers occurring during such pre-cure processing operations, i.e., the "tacky"

surface does not inadvertently adhere to any of the operating elements described hereinabove. The subsequent transfer of loaded stacking trays 42 to storage/transfer containers 54 does not change the disposition of the one-sided graphite plies GP.

However, the conforming operation of the pre-cure processing phase of the ACM² system 10 of the present invention, as described hereinbelow in further detail, requires the "tacky" surface of individual one-sided graphite plies GP to be disposed in facing relation to the molding surface of the composite article mold. To provide the disposition of the one-side graphite plies GP required by the conforming operation, the ACM²system 10 of the present invention includes a ply inversion subsystem 60 as described in the following paragraphs. The ply inversion subsystem 60 is operative to invert the one-sided graphite plies GP so that the "tacky" surface thereof is properly disposed for the conforming operation of the pre-cure processing phase effected by the ACM² system 10 of the present invention. The structural configuration of the ply inversion subsystem 60 is optimized to minimize adherence of the "tacky" surface of the one-side graphite plies GP to the operating elements comprising the ply inversion subsystem 60 which interact with the "tacky" surface.

Figure 6:
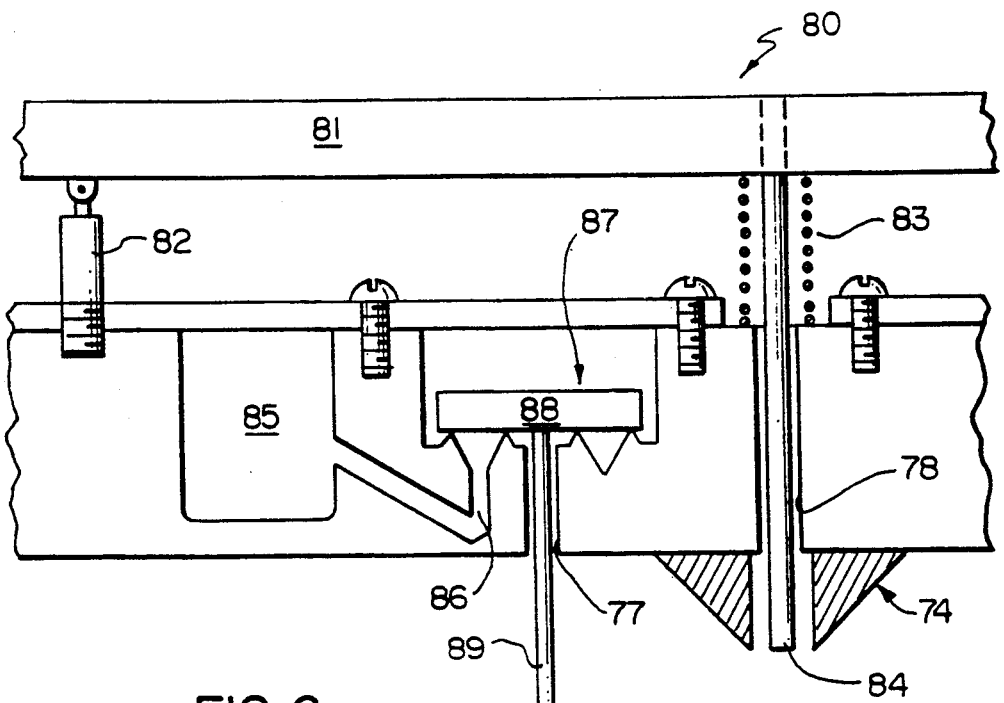
FIG. 6 is a partial cross-sectional view of an internal inverter mechanism for the ply inversion subsystem of FIG. 4.

The ply inversion subsystem 60 includes a robotic transfer arm 62 interconnected by any conventional means such a wiring 63 with the computer control subsystem 150, a workpiece support structure 64, and a vacuum-activated inverter assembly 70 as illustrated in FIGS. 1, and 4, 6. The workpiece support structure 64 includes a workpiece support table 65 and an inverter assembly support frame 66. The workpiece support table 65 is configured to support a loaded stacking tray 42. Control signals from the computer control subsystem 150 activate the automated tray storage/transfer subsystem 50 to position a loaded storage/transfer container 54 adjacent the robotic transfer arm 62, which is operatively controlled by the computer control subsystem 150 to transfer a predetermined loaded stacking tray 42A onto the the workpiece support table 65. The inverter assembly support frame 66 of the workpiece support structure 64 is configured to support the vacuum-activated inverter assembly 70.

An automatic rotational means 67 such as a motor-driven hinge is mounted intermediate the workpiece support table 65 and the inverter assembly support frame 66 and structurally interconnected to the vacuum-activated inverter assembly 70. The hinge means 67 is operative, under the control of the computer control subsystem 150 via interconnection means 68, to rotate the vacuum-activated inverter assembly 70 through a 180° rotational range between a first position adjacent the workpiece support structure 65 and a second position adjacent the inverter assembly support frame 66, as described in further detail hereinbelow.

Figure 5:
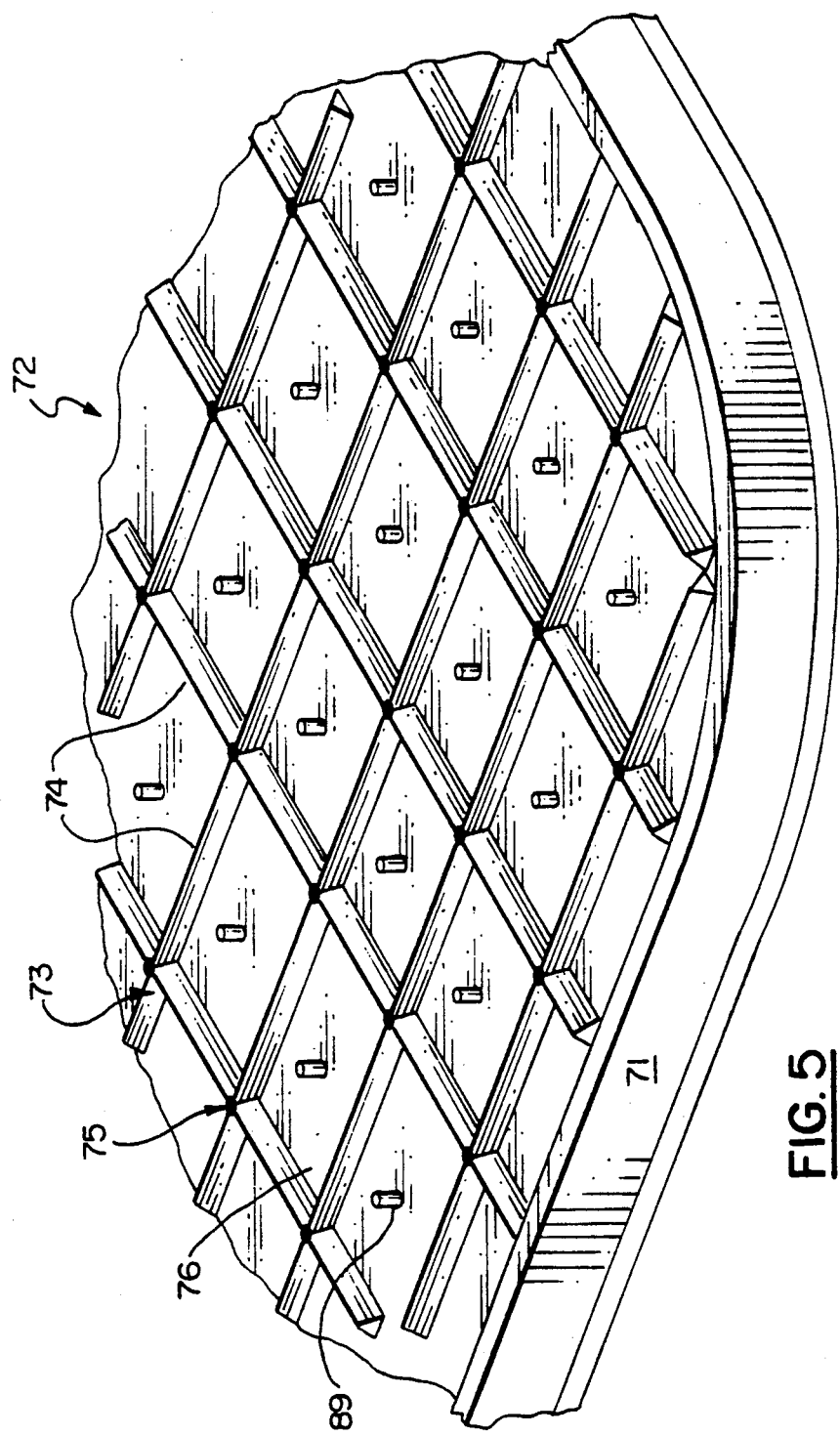
FIG. 5 is a partial perspective view of a interactive inverter surface structure for the ply inversion subsystem of FIG. 4.

The vacuum-activated inverter assembly 70 of the ply inversion subassembly 60 is illustrated in further detail in FIGS. 5, 6 and comprises a vacuum plenum 71 that includes an interactive surface structure 72 and an internal inverter mechanism 80. FIG. 5 illustrates the interactive surface structure 72 of the vacuum-activated inverter assembly 70 while FIG. 6 illustrates the internal inverter mechanism 80 for the vacuum-activated inverter assembly 70.

With reference to FIG. 5, the interactive surface structure 72 includes an elevated grid pattern 73 formed by intersecting wedge-shaped members 74. The wedge-shaped members 74 are formed from a compliant material such as silicone or sponge rubber and are operative to be compressed during pickup and inversion operations so that the wedge-shaped members 74 function as a sealing structure when disposed in abutting engagement with the loaded stacking tray 42A, as discussed in further detail hereinbelow. The wedge-shaped configuration of the members 74 minimizes physical contact between the wedge-shaped members 74 and the "tacky" surface of the one-sided graphite plies GP. The intersecting wedge-shaped members 74 form a plurality of structural nodes 75 and define a plurality of sensor zones 76. Each sensor zone 76 has a predetermined area defined by the spacing between respective wedge-shaped members 74.

In general, the area required for the sensor zones 76 is directly dependent upon the various sizes of the one-sided graphite plies GP that will be inverted, e.g., small one-sided graphite plies GP require sensor zones 76 having correspondingly smaller areas. One embodiment of the interactive surface structure 72 embodies one inch square sensor zones 76. A sensor bore 77 of predetermined diameter extends through the interactive surface structure 72 in the center of each sensor zone 76, and a disengagement bore 78 of predetermined diameter extends through each structural node 75, as more clearly shown in FIG. 6.

With reference to FIG. 6, the internal inverter mechanism 80 includes a movable backing plate 81, a plurality of servo cylinders 82 and springs 83 for regulating the movement of the backing plate 81, and a plurality of disengagement pins 84 rigidly secured to the backing plate 81. The disengagement pins 84 have a configuration such that the disengagement pins 84 are slidably moveable within the disengagement bores 78, and, with the backing plate 81 in a neutral position, the free ends of the disengagement pins 84 are substantially coplanar with the surface of the interactive surface structure 72.

The internal inverter mechanism 80 further includes a vacuum manifold 85 that provides a fluidic interconnection between a vacuum source (not shown) and a plurality of vacuum ports 86. Each vacuum port 86 fluidically interfaces with a vacuum valve 87 consisting of a valve body 88 having an integral sensor stem 89 depending therefrom. Each sensor stem 89 is configured for sliding movement within a corresponding sensor bore 77, and has a length such that the free end thereof lies in a plane parallel to and above the apex plane defined by the wedge-shaped members 74, as illustrated in FIG. 6.

An operating protocol for the ply inversion subsystem 60 described in the preceding paragraphs is described in the following paragraphs. Once the loaded stacking tray 42A is positioned upon the workpiece support table 65, the computer control subsystem 150 generates a control signal to activate the automatic rotational means 67 to rotate the vacuum-activated inverter assembly 70 from the second position (in abutting engagement with the inverter assembly support frame 66 as a result of a prior inversion operation) through the 180° rotational range to the first position wherein the interactive surface structure 72 is in abutting engagement with the loaded stacking tray 42A.

As the vacuum-activated inverter assembly 70 transitions through the last few degrees of the rotational range, sensor stems 89 in alignment with the one-sided graphite plies GP on the elevated grid structure 44 of the loaded stacking tray 42A contact the "tacky" surface of respective one-sided graphite plies GP and are linearly displaced as a result of such contact, such displacement causing corresponding displacement of respective valve bodies 88. Displacement of the valve bodies 88 actuates the corresponding vacuum valves 87 with the result that vacuum forces are exerted in the corresponding sensor zones 76. With the interactive surface structure 72 in the first position (in abutting engagement with the loaded stacking tray 42A), the "activated" sensor zones 76 operate as vacuum cells delimited and sealed by means of the apices of the corresponding wedge-shaped structural members 74 engaging the "tacky" surface of the one-sided graphite plies GP.

The combined vacuum forces exerted by the "activated" sensor zones 76 in response to activation of corresponding vacuum valves 87 is sufficient in magnitude to engage and retain the one-side graphite plies GP in contact with the interactive surface structure 72 of the vacuum-activated inverter assembly 70 ("tacky" surface in facing relation to the interactive surface structure 72). Sensor stems 89 not in alignment with the one-sided graphite plies GP rotate into the open zones 46 of the elevated grid structure 44, and, in consequence, are not subjected to linear displacement. Accordingly, the corresponding vacuum valves 87 are not activated and the associated sensor zones 76 are quiescent, i.e., do not generate vacuum forces.

The computer control subsystem 150 next generates a control signal to rotate the vacuum-activated inverter assembly 70 from the first position through the 180° rotational range into the second position wherein the vacuum-activated inverter assembly 70 is in abutting engagement with the inverter assembly support frame 66. In this position, the "non-tacky" surface of the one-side graphite plies GP are exposed for further pre-cure processing by means of the ACM² system 10 of the present invention. At this point, another control signal from the computer control subsystem 150 causes a termination of the vacuum forces (for example, by temporarily bleeding the vacuum manifold 85) such that the one-sided graphite plies GP are supported solely by the apices of respective wedge-shaped members 74 and the disengagement pins 84. At this point the computer control subsystem 150 may also be operative to activate the robotic transfer arm 62 to position another loaded stacking tray 42 onto the workpiece support table 65 for a subsequent inversion operation.

The aforedescribed ply inversion operation does not effect the spatial coordinates stored in memory of the computer control subsystem 150 which define the positions of the one-sided graphite plies GP vis-a-vis the interactive surface structure 72 (the computer control subsystem 150 may be utilized to perform transformation computations to update memory to account for the effects arising from the 180° rotation of the vacuum-activated inverter assembly 70). It will be appreciated, however, that the spatial coordinates stored in memory may represent only the approximate locations of the one-sided graphite plies GP on the interactive surface structure 72, and not the "true" locations. Small magnitude position errors may be induced during the aforedescribed pre-cure processing operations due to displacements incurred by the one-side graphite plies GP as a result of the operation of the transfer conveyor 21, operation of the ply transfer end effector 35, operation of the robotic transfer arms 52, 62, movement of loaded stacking trays 42 via the automated tray storage/transfer subsystem 50, operation of the ply inversion subsystem 60, etc.

An important attribute of any automated composite material manufacturing system is the maintenance of composite article quality and repeatability. Quality and repeatability may be adversely effected by induced position errors that cause a non-correspondence between the spatial coordinates stored in memory of the computer control subsystem 150 and the "true" position of the one-sided graphite plies GP on the interactive surface structure 72, i.e., the stored spatial coordinates represent only the approximate positions of the one-side graphite plies GP on the interactive surface structure 72.

To provide quality and repeatability in pre-cure processing operations, the ACM² system 10 of the present invention may include a machine vision subsystem 130 as exemplarily illustrated in FIGS. 1, 4. The machine vision subsystem 130 is operative, in combination with the computer control subsystem 150, to provide precise spatial coordinates representing the exact locations of the one-sided graphite plies GP on the interactive surface structure 72 to the ply transfer/layup subsystem 90 described in further detail hereinbelow. The machine vision subsystem 130 is further operative, as described in further detail hereinbelow, to verify that each one-sided graphite ply GP has been removed from the interactive surface structure 72 during operation of the ply transfer/layup subsystem 90.

The machine vision subsystem 130 for the ACM² system 10 illustrated in FIG. 1 includes one or more video cameras 132 positioned so that the field of view thereof encompasses the interactive surface structure 72 and operative to generate video images of the one-sided graphite plies GP on the interactive surface structure 72, and interface means 134 such as wiring for interconnecting the video camera(s) 132 to the computer control subsystem 150. The components and operation of such machine vision subsystems are generally know to those skilled in the art, and accordingly, are not described in further detail herein.

Figure 7:
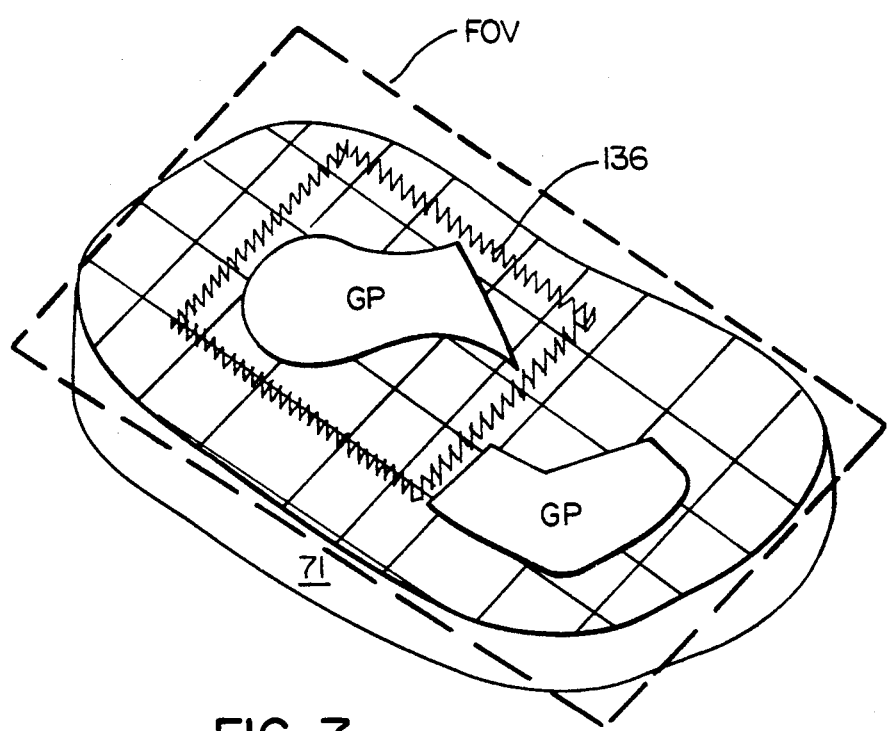
FIG. 7 illustrates exemplary search windows for a machine vision subsystem of the automated composite manufacturing system of FIG. 1.

The computer control subsystem 150 is preprogrammed to control the operation of the machine vision subsystem 130. The computer control subsystem 150 activates the machine vision subsystem 130 to search predetermined windows 136 defined with respect to the interactive surface structure 72 as exemplarily illustrated in FIG. 7. The predetermined search windows 136 are based upon the spatial coordinates stored in memory of the computer control subsystem 150. The use of predetermined search windows 136 provides the machine vision subsystem 130 with the capability to to isolate and image specific individual one-sided graphite plies GP. The size of the search windows 136 may be defined to accommodate induced position errors of predetermined magnitude. One embodiment of the machine vision subsystem 130 can accommodate +/−two inches in positional error and/or +/−10° in orientation error.

Video images of the configuration of individual one-sided graphite plies GP generated by the machine vision subsystem 130 are transmitted to the computer control subsystem 150 for further processing. The processing techniques performed by the computer control subsystem 150, as described in further detail in the following paragraphs, are executed utilizing electronic subsystems and software programs generally know to those skilled in the art, and accordingly, are not described further detail herein.

The computer control subsystem 150 digitally processes the video configuration images generated by the machine vision subsystem 130 to provide digitized configuration images that correspond to the video configuration images. The digitized configuration image of each one-side graphite ply GP may then be enhanced one or more times by the computer control subsystem 150 to maximize the accuracy, i.e., definition, of the outline of such digitized configuration image. The enhanced digitized configuration image may then be subjected to further processing by the computer control subsystem 150 so that specified features of the enhanced, digitized configuration image are isolated for precise position computations. The specified features are also further processed by the computer control subsystem 150 to verify the size and shape or pattern of each one-side graphite ply GP on the interactive surface structure 72.

Generally, straight edge portions of the enhanced, digitized configuration image are selected as the specified feature(s) as computational analysis is easiest for straight edge portions and straight edge portions are generally inherent in the configuration of most one-side graphite plies GP. It will be appreciated, however, that other features of the configuration of the individual one-side graphite plies GP, such as curved portions, corners, holes, etc., may be selected as the specified feature for computational analysis, depending upon the overall configuration of a specific one-sided graphite ply GP.

Once the computed positions of the specified feature(s) of each enhanced, digitized configuration image have been determined, the "true" position of each one-sided graphite ply GP on the interactive surface structure 72 is utilized by the computer control subsystem 150 to control the operation of the ply transfer/layup subsystem 90. In one embodiment, the computer control subsystem 150 compares the computed positions of the specified features against the positions of specified features stored in memory, and computes an off-set representing the "true" position of the individual one-sided graphite plies GP that is utilized by the computer control subsystem 150 to control the operation of the ply transfer/layup subsystem 90. Alternatively, the computer control subsystem 150 may utilize the computed positions to "correct" the original position information stored in memory, by utilizing conventional mathematical techniques, so that the position information stored in memory represents the "true" position of the one-sided graphite plies GP on the interactive surface structure 72.

The ply transfer/layup subsystem 90 is operative, under the control of the computer control subsystem 150 which provides signals representing the "true" position of the one-sided graphite plies GP on the interactive surface structure 72, to pickup individual one-sided graphite plies GP from the interactive surface structure 72, to transfer such one-sided graphite plies GP to the composite article mold (which is located with the ply conforming subsystem 110 described in further detail hereinbelow), and to layup such one-sided graphite plies GP on the corresponding portions of the molding surface of the composite article mold. The transfer and layup operations are controlled by the computer control subsystem 150 based upon the "true" position of each one-side graphite ply GP as discussed hereinabove and the known spatial coordinates of the mold surface of the composite article mold which have been preprogrammed in memory of the computer control subsystem 150.

The ply transfer/layup subsystem 90 for the $ACM^2$ system 10 of the present invention as exemplarily illustrated in FIG. 1 is a robotic system that comprises a stationary gantry 92 having spaced apart rails 93, a cross-member 94 disposed in combination with and operative for movement along said spaced apart rails 93, a telescoping arm 95 disposed in combination with and operative for movement along the cross-member 94, and a ply transfer end effector 96 disposed in combination with and operative for rotational movement with respect to the telescoping arm 95. The ply transfer end effector 96 is thus effectively operative for longitudinal, lateral, vertical, and rotational movement with respect to the one-sided graphite plies GP on the interactive surface structure 72 and with respect to the molding surface of the composite article mold.

The ply transfer end effector 96 may embody a structural configuration and be functionally equivalent to the ply transfer end effector 35 described hereinabove, including the vacuum-actuated transfer feet 36. Such commonality of components provides some advantages for the $ACM^2$ system 10 of the present invention. It will be appreciated, however, that the ply transfer end effectors 96 of the ply transfer/layup subsystem 90 interact with the "non-tacky" surfaces of the one-sided graphite plies GP. Therefore, the ply transfer end effector 96 does not require vacuum-actuated transfer feet 36 that include mechanical stems to disengage the one-sided graphite plies GP. Rather, the termination of vacuum pressure exerted the vacuum-actuated transfer feet of the ply transfer end effector 96 will result in the release of the "non-tacky" surface of the one-sided graphite plies GP.

Operationally, in response to "true" position signals provided by the computer control subsystem 150, the ply transfer end effector 96 is precisely positioned over the one-sided graphite ply GP to be picked up from the interactive surface structure 72. Another set of control signals lowers the ply transfer end effector 96 to a position adjacent the one-side graphite ply GP, activates (extends) the respective vacuum-actuated transfer feet, which in combination define an operating face that matches the configuration of the one-sided graphite ply GP to be picked up, and actuates the respective vacuum-actuated transfer feet forming the operating face to implement the pickup operation.

A subsequent set of control signals raises the ply transfer end effector 96 holding the one-sided graphite ply GP, and simultaneously moves the ply transfer end effector 96 over the appropriate portion of the mold surface of the composite article mold. Once the ply transfer end effector 96 is properly positioned, another set of control signals lowers the ply transfer end effector 96, as required, to place the one-sided graphite ply GP onto the appropriate mold surface, implements the placement operation to either mechanically disengage the one-side graphite ply GP from the operating face or terminates the vacuum pressure to release the one-side graphite ply GP, and causes the respective vacuum-actuated transfer feet forming the operating face to retract into the ply transfer end effector 96.

The operating protocol described hereinabove is repeated as necessary until all one-side graphite plies GP comprising a given group Gr have been removed from the interface surface structure 72 and layed up on the mold surface. The transfer/layup cycle time may be reduced by utilizing the ply transfer end effector 96 in the multiple operating face configuration as described hereinabove.

The ply conforming subsystem 110 for the ACM² system 10 is illustrated in FIGS. 1, 8A, 8B, 8C. The ply conforming subsystem 110 is operative to conform the layed-up one-side graphite plies GP to the mold surface by means of vacuum pressure applied through a compliant bladder. Inasmuch as the compliant bladder may be adversely affected or degraded by contact with the organic resin of the preimpregnated composite materials, one-sided graphite plies GP are the preferred material for the ACM² system 10 of the present invention. In addition, the use of one-sided graphite plies GP facilitates removal of the compliant bladder from the mold surface after the conforming operation, as described hereinbelow in further detail. The ply conforming subsystem 110 of the present invention has a structural configuration that is conducive for integrated operation in combination with the ply transfer/layup subsystem 90 described hereinabove.

Figure 8A:
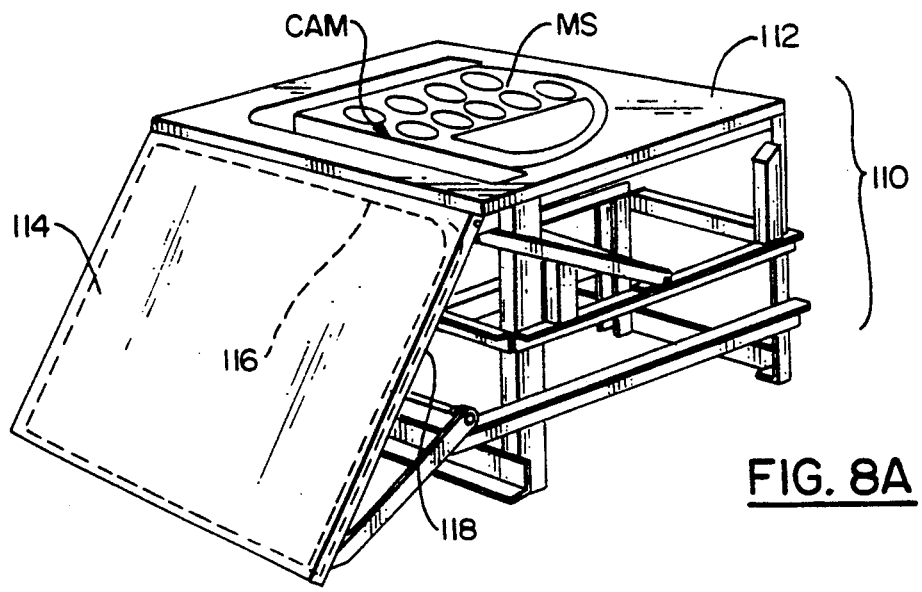
FIGS. 8A, 8B, 8C illustrate a ply conforming subsystem for the automated composite material manufacturing system of FIG. 1.
Figure 8B:
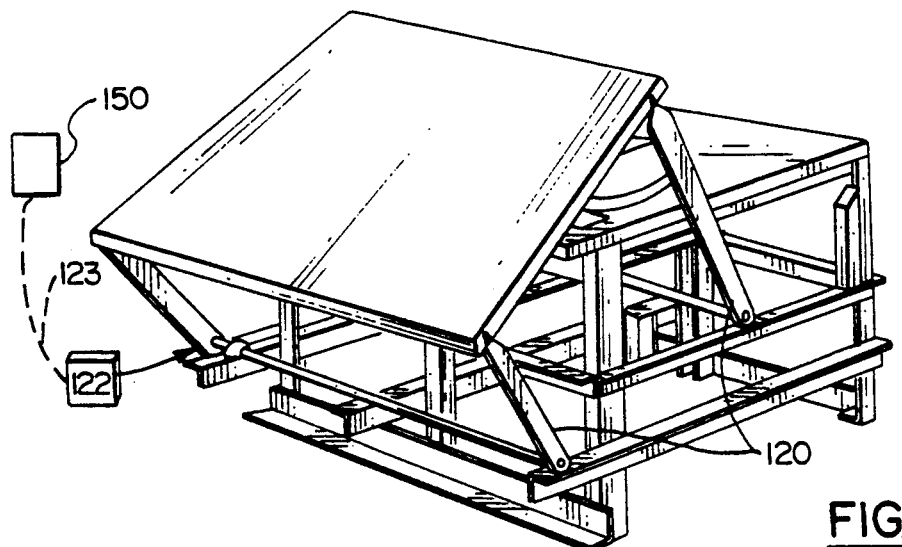
Figure 8C:
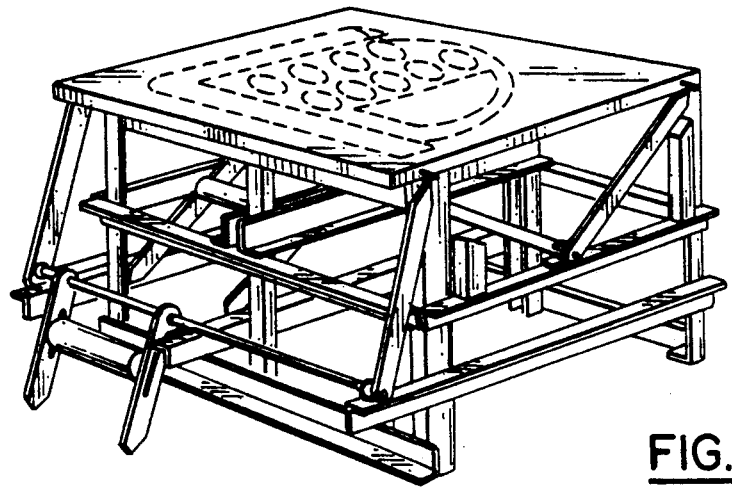

With reference to FIGS. 8A, 8B, 8C, the ply conforming subsystem 110 includes a support table 112 that provides support for the composite article mold CAM having a predetermined mold surface MS, a frame member 114 supporting a flexible, impervious membrane or bladder 116, a wedge-shaped seal 118 disposed about the mold CAM that is operative to provide sealing between the bladder 116 and the support table 112, and a four-bar linkage mounting assembly 120 for structurally interconnecting the support table 112 and the frame member 114. Each link member 120 is pivotally mounted at one end to the support table 112 and pivotally mounted at the other end to the frame member 114. At least two of the link members 120 have ends extending above the plane of the mold surface MS. A drive motor 122, interfaced with the computer control subsystem 150 by any conventional means such as wiring 123, is operatively interconnected to the four-bar linkage mounting assembly 120.

Control signals generated by the computer control subsystem 150 activate the drive motor 122 to cause rotation of the four bar linkage mounting assembly 120 to alternately rotate the frame member to a displaced position (FIG. 8A) and a contact position (FIG. 8C). In the contact position, the bladder 116 is disposed in sealed combination with the support table 112 so that the bladder 116 may be vacuumized to conform the layed-up one-side graphite plies GP to the mold surface MS. In the displaced position, the frame member 114 and bladder 116 are stowed below the plane of the mold surface MS. Such a stowage position permits the ply transfer/layup subsystem 90 to have full access to the mold surface MS.

The function of the computer control subsystem 150 has been fully described in the preceding paragraphs vis-a-vis the various components controlled thereby. The computer control subsystem 150 may be any of the various types of computers generally utilized for control of automated manufacturing systems.

A variety of modifications and variations of the present invention are possible in light of the above teachings. It is therefore to be understood that, within the scope of the appended claims, the present invention may be practiced otherwise than as specifically described hereinabove.

I claim:

1. An integrated, automated composite material manufacturing system for pre-cure processing of preimpregnated composite material having at least one tacky surface, comprising:
control subsystems means for controlling and synchronizing the pre-cure processing operations effected by said integrated, automated composite material manufacturing system;
cutting means operative in response to first control signals from said control subsystems means for controlled cutting of the preimpregnated composite material into individual composite plies of predetermined size and shape based upon predetermined composite ply configurations stored in said control subsystem means;
ply loading means operative in response to second control signals from said control subsystems means for providing automatic pickup, transfer and placement operations to load the individual composite plies, said ply loading means including
a numerically controlled carriage subassembly having a ply transfer end effector that includes an array of bi-functional transfer feet, and
a numerically controlled tray handling apparatus disposed in combination with and movable with respect to said numerically controlled carriage subassembly, said numerically controlled tray handling apparatus having a stacking tray mounted in combination therewith,
said numerically controlled carriage subassembly and said ply transfer end effector being operative in response to said second control signals to position said ply transfer end effector over the individual composite plies,
said ply transfer end effector being operative in response to said second control signals to selectively activate a multiplicity of said bi-functional transfer feet to form a predetermined combination corresponding to the predetermined size and shape of the individual composite plies, said selectively activated bi-functional transfer feet being operative to engage and retain and to mechanically disengage and release the tacky surface of the individual composite plies to load the individual composite plies onto said stacking tray, and wherein,
said numerically controlled tray handling apparatus is operative in response to said second control signals for synchronized movement with respect to said ply transfer end effector for positioning said numerically controlled tray handling apparatus beneath said ply transfer end effector to load the individual composite plies onto said stacking tray;
means for automatically transferring said loaded stacking tray of individual composite plies for subsequent precure processing;
ply conforming subsystem means operative in response to fourth control signals from said control subsystems means for conforming layed-up individual composite plies, said ply conforming subsystem means including
a support table,
said support table including a composite article mold having a predetermined mold surface,
a frame member having a flexible impervious membrane disposed in combination therewith, and a mounting assembly structurally and functionally interconnecting said frame member with said support table, said mounting assembly being alternatively operative in response to said fourth control signals to rotate said frame member to a contact position wherein said flexible impervious membrane is adjacent said predetermined mold surface and operative to conform layed-up individual composite plies to said predetermined mold surface and to rotate said frame member to a displaced position wherein said frame member is stowed below said predetermined mold surface to facilitate lay-up of the individual composite plies; and ply transfer/layup means operative in response to third control signal means from said control subsystem means for providing automatic pickup, transfer and placement operations to lay-up the individual composite plies from said loaded stacking tray onto said predetermined mold surface of said composite article mold, said ply transfer/layup means including a ply transfer end effector having an array of bifunctional transfer feet, and means operative in response to said third control signals for positioning said ply transfer end effector with respect to the individual composite plies from said loaded stacking tray, wherein said ply transfer end effector is operative in response to said third control signals to selectively activate a multiplicity of said array of bi-functional transfer feet to form a predetermined combination corresponding to the predetermined size and configuration of the individual composite plies from said loaded stacking tray, said selectively activated bi-functional transfer feet being operative to engage and retain and disengage and release the individual composite plies in layed-up combination with said predetermined mold surface of said composite article mold.

2. The integrated, automated composite material manufacturing system of claim 1 wherein said mounting assembly of said ply conforming subsystem means comprises:

four link members, each said link member being pivotally mounted at one end thereof to said support table and being pivotally mounted at the other end thereof to said frame member; and a drive motor operatively interconnected to at least one of said link members;

said drive motor being interfaced with said control subsystem means and operative in response to said fourth control signals to cause rotation of said four link members such that said frame member is rotated into said contact position wherein said flexible impervious membrane is adjacent said predetermined mold surface and operative conform layed-up individual composite plies to said predetermined mold surface and such that said frame member is rotated to said displaced position wherein said frame member is stowed below said predetermined mold surface to facilitate lay-up of the individual composite plies.

3. The integrated, automated composite material manufacturing system of claim 1 further comprising ply inversion subsystem means disposed prior to said ply transfer-layup means and operative in response to fifth control signal means for engaging and retaining the individual composite plies from said loaded stacking tray, and wherein said ply inversion subsystem means is further operative in response to said fifth control signals to invert the retained individual composite plies through 180° so that the at least one tacky surface of the individual composite plies are positioned for lay-up in facing relation to said predetermined mold surface of said composite article mold.

4. The integrated, automated composite material manufacturing system of claim 1 wherein said ply inversion subsystem means comprises:

a workpiece support structure;

a vacuum-activated inverter assembly disposed in combination with said workpiece support structure and operative to engage and retain the individual composite plies from said loaded stacking tray; and said vacuum-activated inverter assembly including automated rotational means operative in response to said fifth control signals for rotating said vacuum-activated inverter assembly through 180° from a first position to a second position and vice versa; and wherein said vacuum-activated inverter assembly is operative in said first position to engage and retain the individual composite plies from said loaded stacking tray; and wherein said vacuum-activated inverter assembly positions the individual composite plies engaged and retained thereby for pickup operations by said ply transfer/layup means in said second position.

5. The integrated, automated composite material manufacturing system of claim 4 wherein said workpiece support structure includes a workpiece support table and an inverter assembly support frame, and wherein said vacuum-activated inverter assembly is disposed in combination with said workpiece support table and said inverter assembly support frame intermediate therebetween, said inverter assembly support frame being operative to support said vacuum-activated inverter assembly in said second position, and said workpiece support table being operative to support said loaded stacking tray.

6. The integrated, automated composite material manufacturing system of claim 5 further comprising a robotic transfer arm operative in response to said fifth control signals for transferring said loaded stacking tray to said workpiece support table.

7. The integrated, automated composite material manufacturing system of claim 5 wherein said vacuum-activated inverter assembly comprises:

a vacuum plenum having an interactive surface structure and an internal inverter mechanism;

said internal inverter mechanism being operative in said first position to selectively provide vacuum forces for engaging and retaining the individual composite plies from said loaded stacking tray;

said internal inverter mechanism being operative in said second position, in response to said fifth control signals, to terminate said selectively provided vacuum forces;

said interactive surface structure being structurally configured and operative in combination with said internal inverter mechanism in said first position to define active sensor zones for said selectively provided vacuum forces wherein the individual composite plies are engaged and retained by means of the vacuum forces acting through said active sensor zones.

8. The integrated, automated composite material manufacturing system of claim 7 wherein said interactive surface structure comprises:

a plurality of intersecting wedge-shaped members forming an elevated grid pattern that defines a plurality of sensor zones, said plurality of intersecting wedge-shaped members forming a plurality of structural nodes, and wherein each of said plurality of structural nodes has a disengagement bore extending therethrough and each of said plurality of sensor zones has a sensor bore extending therethrough; and wherein said internal inverter mechanism comprises, a movable backing plate, a plurality of disengagement pins rigidly secured to said backing plate and disposed for sliding movement in said respective disengagement bores, means for regulating movement of said movable backing plate with respect to said vacuum plenum, and a plurality of vacuum valves disposed in combination in said vacuum plenum, each of said vacuum valves having an integral sensor stem disposed for sliding movement in said respective sensor bore; wherein, respective ones of said integral sensor stems in alignment with the individual composite plies in said first position are linearly displaced causing actuation of said corresponding vacuum valves to selectively provide said vacuum forces in said active sensor zones for engaging and retaining the individual composite plies.

9. A ply conforming subsystem for pre-curing processing of individual composite plies of preimpregnated composite material having at least one tacky surface, comprising:

a support table;

said support table including a composite article mold having a predetermined mold surface;

a frame member having a flexible impervious membrane disposed in combination therewith; and a mounting assembly structurally and functionally interconnecting said frame member with said support table;

said mounting assembly being alternatively operative to rotate said frame member to a contact position wherein said flexible impervious membrane is adjacent said predetermined mold surface and operative to conform layed-up individual composite plies to said predetermined mold surface and to rotate said frame member to a displaced position wherein said frame member is stowed below said predetermined mold surface to facilitate lay-up of the individual composite plies.

10. The ply conforming subsystem of claim 9 wherein said mounting assembly comprises:

four link members, each said link member being pivotally mounted at one end thereof to said support table and being pivotally mounted at the other end thereof to said frame member; and a drive motor operatively interconnected to at least one of said link members;

said drive motor being operative to cause rotation of said four link members such that said frame member is rotated into said contact position wherein said flexible impervious membrane is adjacent said predetermined mold surface and operative to conform layed-up individual composite plies to said predetermined mold surface and such that said frame member is rotated to said displaced position wherein said frame member is stowed below said predetermined mold surface to facilitate lay-up of the individual composite plies.

11. A ply inversion subsystem for pre-curing processing of individual composite plies of preimpregnated composite material having only one tacky surface, the individual composite plies being loaded on a stacking tray with the tacky surface of the individual composite plies facing upwardly, comprising:

a workpiece support structure;

a vacuum-activated inverter assembly disposed in combination with said workpiece support structure and operative to engage and retain the tacky surface of the individual composite plies of the stacking tray;

said vacuum-activated inverter assembly including automated rotational means for rotating said vacuum-activated inverter assembly through 180 from a first position to a second position and vice versa; and wherein, said vacuum-activated inverter assembly is operative in said first position to engage and retain the tacky surface of the individual composite plies of the stacking tray; and wherein, said vacuum-activated inverter assembly positions the individual composite plies engaged and retained thereby with the non-tacky surface facing upwardly in the second position.

12. The ply inversion subsystem of claim 11 wherein said workpiece support structure includes a workpiece support table and an inverter assembly support frame, and wherein said vacuum-activated inverter assembly is disposed in combination with said workpiece support table and said inverter assembly support frame intermediate therebetween, said inverter assembly support frame being operative to support said vacuum-activated inverter assembly in said second position, and said workpiece support table being operative to support the stacking tray.

13. The ply inversion subsystem of claim 11 wherein said vacuum-activated inverter assembly comprises:

a vacuum plenum having an interactive surface structure and an internal inverter mechanism;

said internal inverter mechanism being operative in said first position to selectively provide vacuum forces for engaging and retaining the individual composite plies from the stacking tray;

said internal inverter mechanism being operative in said second position, in response to a control signal, to terminate said selectively provided vacuum forces;

said interactive surface structure being structurally configured and operative in combination with said internal inverter mechanism in said first position to define active sensor zones for said selectively provided vacuum forces wherein the individual composite plies are engaged and retained by means of the vacuum forces acting through said active sensor zones.

14. The ply inversion subsystem of claim 13 wherein said interactive surface structure comprises:

a plurality of intersecting wedge-shaped members forming an elevated grid pattern that defines a plurality of sensor zones, said plurality of intersecting wedge-shaped members forming a plurality of structural nodes, and wherein each of said plurality of structural nodes has a disengagement bore extending therethrough and each of said plurality of sensor zones has a sensor bore extending therethrough; and wherein said internal inverter mechanism comprises, a movable backing plate, a plurality of disengagement pins rigidly secured to said backing plate and disposed for sliding movement in said respective disengagement bores, means for regulating movement of said movable backing plate with respect to said vacuum plenum, and a plurality of vacuum valves disposed in combination in said vacuum plenum, each of said vacuum valves having an integral sensor stem disposed for sliding movement in said respective sensor bore; wherein, respective ones of said integral sensor stem sin alignment with the individual composite plies in said first position are linearly displaced causing actuation of said corresponding vacuum valves to selectively provide said vacuum forces in said active sensor zones for engaging and retaining the tacky surface of the individual composite plies.

* * * * *